(12) United States Patent
O'Donnell

(10) Patent No.: US 9,396,279 B1
(45) Date of Patent: Jul. 19, 2016

(54) COLLABORATIVE VIRTUAL MARKUP

(75) Inventor: Neil O'Donnell, Avondale, PA (US)

(73) Assignee: JPMorgan Chase Bank, NA, New York, NY (US)

(*) Notice: Subject to any disclaimer, the term of this patent is extended or adjusted under 35 U.S.C. 154(b) by 686 days.

(21) Appl. No.: 12/372,406

(22) Filed: Feb. 17, 2009

(51) Int. Cl.
*G06F 17/00* (2006.01)
*G06F 17/30* (2006.01)
*H04L 29/06* (2006.01)

(52) U.S. Cl.
CPC ........ *G06F 17/3089* (2013.01); *H04L 65/4007* (2013.01)

(58) Field of Classification Search
CPC . G06F 17/20; G06F 17/3089; H04L 65/4007; H04N 1/2179
USPC ........... 715/229–233, 255, 256, 751; 709/204
See application file for complete search history.

(56) References Cited

U.S. PATENT DOCUMENTS

| | | | |
|---|---|---|---|
| 6,496,203 B1 * | 12/2002 | Beaumont | G06F 9/4443 715/744 |
| 6,578,000 B1 * | 6/2003 | Dodrill | G10L 15/26 704/270 |
| 6,643,663 B1 * | 11/2003 | Dabney | G06Q 10/10 |
| 6,687,878 B1 | 2/2004 | Eintracht et al. | |
| 6,724,918 B1 | 4/2004 | Yen et al. | |
| 6,785,891 B1 * | 8/2004 | Allen | G06F 9/544 707/E17.116 |
| 7,000,184 B2 * | 2/2006 | Matveyenko | G06F 17/2247 715/235 |
| 7,152,203 B2 * | 12/2006 | Gao et al. | 715/240 |
| 7,249,314 B2 * | 7/2007 | Walker | G06F 17/24 715/205 |
| 7,337,093 B2 | 2/2008 | Ramani et al. | |
| 7,593,943 B2 * | 9/2009 | Clarke | G06Q 10/10 |
| 7,698,631 B1 * | 4/2010 | Toebes | G06F 17/24 715/234 |
| 7,941,399 B2 * | 5/2011 | Bailor | G06F 17/24 707/608 |
| 7,945,595 B1 * | 5/2011 | Kraley | G06F 17/211 707/802 |
| 7,949,633 B1 * | 5/2011 | Shaver | G06F 17/24 707/620 |
| 8,028,229 B2 * | 9/2011 | Bailor | G06F 17/2288 715/255 |
| 8,041,764 B1 * | 10/2011 | Albani | G06F 17/3089 709/203 |
| 8,073,812 B2 * | 12/2011 | Curtis | G06Q 10/10 706/45 |
| 8,195,772 B2 * | 6/2012 | Marmor | G06F 17/2247 709/218 |
| 8,260,964 B2 * | 9/2012 | Marmor | H04L 67/2823 709/201 |
| 8,261,123 B2 * | 9/2012 | Miyamoto | G06F 3/1207 714/44 |
| 8,285,787 B2 * | 10/2012 | Ferris | G06Q 10/10 709/204 |
| 8,286,077 B2 * | 10/2012 | Zhang | G06F 17/2211 715/229 |
| 8,301,588 B2 * | 10/2012 | Kannan | G06F 17/30227 707/608 |
| 8,346,768 B2 * | 1/2013 | Bailor | G06Q 10/06 707/707 |

(Continued)

*Primary Examiner* — Mohammed-Ibrahim Zuberi
(74) *Attorney, Agent, or Firm* — Goodwin Procter LLP

(57) ABSTRACT

A system and computer-implemented method for collaborative markup of digital media such as an Internet website are disclosed. In one embodiment, multiple users can collaboratively and create, view, markup, and revise the contents and layout of a retrieved website or webpage in real-time prior to publication or production release.

14 Claims, 24 Drawing Sheets

(56) References Cited

U.S. PATENT DOCUMENTS

| | | | | |
|---|---|---|---|---|
| 8,352,870 | B2 * | 1/2013 | Bailor | G06Q 10/10 715/230 |
| 8,370,628 | B2 * | 2/2013 | Mundy | G06F 21/6209 707/608 |
| 8,392,828 | B2 * | 3/2013 | Yoo | G06F 17/212 715/255 |
| 8,397,153 | B1 * | 3/2013 | Lee | G06F 17/211 715/204 |
| 8,417,666 | B2 * | 4/2013 | Bailor | G06F 17/24 707/608 |
| 8,429,753 | B2 * | 4/2013 | Skaria | G06F 21/6218 709/225 |
| 8,434,002 | B1 * | 4/2013 | Shah | G06F 17/212 715/200 |
| 8,453,052 | B1 * | 5/2013 | Newman | G06F 17/2211 715/255 |
| 8,464,148 | B1 * | 6/2013 | Wichary | G06F 17/3089 715/234 |
| 8,471,871 | B1 * | 6/2013 | Saviano | G06F 17/30899 345/661 |
| 8,504,929 | B2 * | 8/2013 | Sullivan | G06F 8/38 715/751 |
| 8,516,155 | B1 * | 8/2013 | Marmor | G06F 17/30905 709/201 |
| 8,572,030 | B2 * | 10/2013 | Clarke | G06F 17/30174 707/610 |
| 8,572,760 | B2 * | 10/2013 | Jain | G06F 21/6218 726/30 |
| 8,595,691 | B2 * | 11/2013 | Ellen | G06Q 30/02 717/106 |
| 8,682,989 | B2 * | 3/2014 | Meisels | G06F 17/24 709/206 |
| 8,683,342 | B2 * | 3/2014 | Van Riel | G06F 17/30861 707/695 |
| 8,689,352 | B2 * | 4/2014 | Schaad | G06F 21/6209 707/608 |
| 8,739,021 | B2 * | 5/2014 | Yuniardi | G06F 17/2288 709/206 |
| 8,745,052 | B2 * | 6/2014 | Seshadrinathan | G06F 17/246 707/736 |
| 8,762,327 | B2 * | 6/2014 | Van Riel | G06F 17/24 707/610 |
| 8,769,045 | B1 * | 7/2014 | Saviano | G06F 21/6218 709/203 |
| 8,805,930 | B2 * | 8/2014 | Ferris | H04L 65/4015 707/608 |
| 8,812,946 | B1 * | 8/2014 | Kopylov | G06F 17/2247 715/202 |
| 8,825,594 | B2 * | 9/2014 | Skaria | G06Q 10/10 707/608 |
| 8,825,758 | B2 * | 9/2014 | Bailor | G06F 17/30168 709/204 |
| 8,843,816 | B2 * | 9/2014 | Stull | G06Q 10/10 715/200 |
| 8,892,628 | B2 * | 11/2014 | Nicholson | H04L 67/14 709/202 |
| 8,893,017 | B2 * | 11/2014 | Rein | G06F 17/30575 715/738 |
| 8,935,705 | B2 * | 1/2015 | Martin | G06F 9/4843 718/102 |
| 8,965,983 | B2 * | 2/2015 | Costenaro | G06F 17/241 705/311 |
| 8,984,392 | B2 * | 3/2015 | Clarke | G06F 17/2211 715/220 |
| 8,996,621 | B2 * | 3/2015 | Kleppner | G06F 17/241 709/206 |
| 9,021,346 | B2 * | 4/2015 | Edmunds | G06F 17/21 715/206 |
| 9,055,089 | B2 * | 6/2015 | Willner | H04L 67/14 |
| 9,087,134 | B2 * | 7/2015 | Tierney | G06F 17/3089 |
| 9,137,185 | B2 * | 9/2015 | Costenaro | H04L 67/2857 |
| 9,141,669 | B2 * | 9/2015 | Jellick | H04L 41/082 |
| 9,147,004 | B2 * | 9/2015 | Coursol | G06F 17/3089 |
| 9,165,285 | B2 * | 10/2015 | Schultz | H04L 51/08 |
| 9,176,943 | B2 * | 11/2015 | Shaver | G06F 17/241 |
| 9,218,102 | B1 * | 12/2015 | Greenspan | G06F 3/0481 |
| 9,229,920 | B1 * | 1/2016 | Fiedler | G06F 17/24 |
| 9,244,895 | B2 * | 1/2016 | Toebes | G06F 17/24 |
| 9,253,130 | B2 * | 2/2016 | Zaveri | H04L 51/046 |
| 9,256,341 | B2 * | 2/2016 | Megiddo | G06F 3/048 |
| 9,280,529 | B2 * | 3/2016 | Lemonik | G06F 17/241 |
| 2002/0059344 | A1 * | 5/2002 | Britton | G06F 17/211 715/239 |
| 2002/0091725 | A1 | 7/2002 | Skok | |
| 2002/0116418 | A1 * | 8/2002 | Lachhwani | G06F 17/212 715/244 |
| 2003/0004771 | A1 * | 1/2003 | Yaung | 705/8 |
| 2003/0204810 | A1 * | 10/2003 | Dam | G06F 17/3089 715/255 |
| 2003/0225764 | A1 | 12/2003 | Smith et al. | |
| 2004/0088647 | A1 | 5/2004 | Miller et al. | |
| 2004/0148565 | A1 * | 7/2004 | Davis | G06F 17/3089 715/205 |
| 2004/0243829 | A1 * | 12/2004 | Jordan | 713/200 |
| 2007/0073776 | A1 | 3/2007 | Kalalian et al. | |
| 2007/0294614 | A1 * | 12/2007 | Jacquin et al. | 715/512 |
| 2008/0059539 | A1 | 3/2008 | Chin et al. | |
| 2008/0201242 | A1 * | 8/2008 | Minnis et al. | 705/27 |
| 2008/0301228 | A1 * | 12/2008 | Flavin | 709/204 |
| 2009/0006454 | A1 * | 1/2009 | Zarzar | G06F 17/2247 |
| 2009/0006948 | A1 | 1/2009 | Parker et al. | 715/255 |
| 2009/0031225 | A1 | 1/2009 | Toebes et al. | 715/760 |
| 2009/0307666 | A1 * | 12/2009 | Kilian | G06F 11/3604 717/125 |

* cited by examiner

| 1401 Symbol | 1403 Meaning | 1405 Example |
|---|---|---|
| ⌒ or ᵧ or ⌐ | delete | take ⁄out |
| ◠ | close up | print as o͡ne word |
| ⌒̸ | delete and close up | cl⌿ose up |
| ∧ or > or ⋀ | caret | insert here ⌃something |
| # | insert a space | put on⌃here |
| eq# | space evenly | space⌃evenly⌃where⌃indicated |
| stet | let stand | let marked ~~text~~ stand as set |
| tr | transpose | change ⌒order ⌒the |
| / | used to separate two or more marks and often as a concluding stroke at the end of an insertion | |
| [ | set farther to the left | ⌐ too far to the right |
| ] | set farther to the right | too | far to the left |
| ⌒ | set as ligature (such as æ) | encyclop⌒aedia |
| = | align horizontally | al⌀ignment |
| ‖ | align vertically | ‖ align with surrounding text |
| × | broken character | imperf×ect |
| □ | indent or insert em quad space | |
| ¶ | begin a new paragraph | |
| ⓢⓟ | spell out | set ⟨5 lbs.⟩ as five pounds |
| cap | set in CAPITALS | set nato as NATO |
| sm cap or s.c. | set in SMALL CAPITALS | set signal as SIGNAL |
| lc | set in lowercase | set ⁄South as south |
| ital | set in *italic* | set oeuvre as *oeuvre* |

Fig. 14A

| Symbol | Meaning | Example |
|---|---|---|
| rom | set in roman | set *mensch* as monsch |
| bf | set in boldface | set important as important |
| = or -/ or ≐ or /H/ | hyphen | multi-colored |
| 1/N or en or /N/ | en dash | 1965–72 |
| 1/M or em or /M/ | em (or long) dash | Now—at last!—we know. |
| ∨ | superscript or superior | ²∨ as in πr² |
| ∧ | subscript or inferior | ∧₂ as in H₂0 |
| ◇ or ✕ | centered | ◇ for a centered dot in p · q |
| ⌄ | comma | |
| ⌄ | apostrophe | |
| ⊙ | period | |
| ; or ;/ | semicolon | |
| : or ⊙ | colon | |
| ⌄⌄ or ⌄⌄ | quotation marks | |
| (/) | parentheses | |
| [/] | brackets | |
| ok/? | query to author: has this been set as intended? | |
| ↓ or ⊥¹ | push down a work-up | an unintended mark |
| ⊙¹ | turn over an inverted letter | inverted |
| wf¹ | wrong font | wrong siZe or stylę |

Fig. 14B

COLLABORATIVE VIRTUAL MARKUP

BACKGROUND

The development of marketing materials is a collaborative process requiring the input of many interested parties who often have different perspectives and priorities when creating or revising the materials. Conventionally, marketing materials involves a time- and paper-intensive, iterative process of composing a draft of marketing materials on paper or computer, printing the draft onto paper, marking up the paper draft to denote changes that need to be made, then revising the draft (whether on paper or computer) based on the marked up paper draft. In addition to consuming a significant amount of paper and time resources, the conventional markup process is also difficult to coordinate.

Software packages such as Adobe Dreamweaver™ and Microsoft Word™ have attempted to improve upon the conventional paper-based process by providing proprietary solutions. Adobe Dreamweaver™ is a popular stand-alone software package for designing, developing and maintaining websites and Internet applications. Dreamweaver™ is designed to allow a single licensed user to create and edit nearly any aspect of a website. Microsoft Word™ is a popular stand-alone software package for word processing that includes a feature called "Track Changes" which uses metadata to store the series of changes in the documents format and content. Although Word™ generally focuses allowing a single licensed user to create and revise standard word processing documents, the Track Changes feature allows a second user to see the revisions made by a previous user.

Further, some versions of Microsoft Netmeeting™ and other programs have attempted to allow for collaborative viewing and editing of images using a "whiteboard" space shared among, for example, videoconferencing users. Additionally, conventional approaches also include shared browsing of web pages and allowing a user to post or upload personalized content to a hosted webpage such as a web log (blog), social networking page, or discussion group.

U.S. Pat. No. 6,266,683 to Yehuda et al., the entire disclosure of which is incorporated herein by reference, describes a computerized document system for managing a document acted upon by at least one participant in creating, evaluating or revising the document. The Yehuda system parses or divides the document into a plurality of segments based on the content of the document, receives comments from a participant pertaining to a segment of the document, and associates each comment with the segment to which the comment pertains.

U.S. Patent Pub. No. 2007/0073776 to Kalalian et al. describes an enterprise-level, digital asset management system that allows users to upload digital assets, such as digital image files, to a central on-line site to view, edit, manage, arrange, organize, annotate and adjust the digital images. Multiple parties can communicate and collaborate with one another in real-time in connection with a project involving the digital images. A user-interface module can display editing tools to allow a user to mark-up a displayed image and to enter text notes on a displayed image. Other users with appropriate privileges can view these mark-ups and text notes.

U.S. Pat. No. 6,724,918 to Yen et al. describes a software program that allows clients to exchange graphical information of free hand drawn sketches together with correlated multimedia information such as verbal information or secondary video information. Clients can create freehand sketches in which the drawing process is captured using time stamps. Accordingly, a sketch can be recreated later in a replay.

U.S. Patent Pub. No. 2003/0225764 to Smith et al. describes a system for displaying customer data to multiple users with varying editing permissions through a web-based interface. For example, the system allows a loan officer and real estate agent to collaborate on work associated with a prospective customer or a pending contract.

U.S. Patent Pub. No. 2004/0088647 to Miller et al. describes a system for processing extensible markup language (XML) documents over the web including an XML editing system having a template system for editing XML templates, a content editing system for editing XML content associated with a template, and a document collaboration system for controlling access to XML documents. For example, a document template may include a press release or product release template. Users check out XML documents for editing from an organization's database and check in the documents when finished, thereby creating an audit trail of users who edited the document. Users also have associated permission or privilege levels which restrict the extent to which the user can edit the document template or content. Upon checking a document in, another user is notified that the document is ready to review or edit.

U.S. Patent Pub. No. 2002/0091725 to Skok describes a method and apparatus for providing content creation and management within a browser context. A user can contribute to a web document by adding new material or editing data that is already part of the document. The process steps include authorization, creation and editing, approval and publishing.

U.S. Patent Pub. No. 2008/0059539 to Chin et al. describes a system allowing users to create, edit, manage, collaborate and communicate on documents such as word processing documents, spreadsheets, databases, slides and diagram editors. Documents are broken down into workable elements, and changes are tracked in a centralized database. Users use a web browser and/or desktop as the client front end. Changes to the document are communicated back and forth to the database using JavaScript and XML.

U.S. Pat. No. 6,687,878 to Eintracht et al. describes a system for collaborative document annotation in which notes associated with an image or text document are stored in a database on a central server. A client functions to display the document and provides the tools necessary to permit the user to create, edit, delete, retrieve and store notes.

U.S. Pat. No. 7,337,093 to Ramani et al. describes a system for collaborative three-dimensional (3D) markup. A 3D representation of a shape is obtained using a web-based interface. A client marks the 3D representation in the user workspace and additional clients are capable of displaying the marked-up 3D representation in their respective user workspaces.

Conventional solutions also include the screen capture software by TechSmith Corp., Snagit. Snagit allows a user to take a snapshot of a user's computer screen. The software also allows the user to edit the capture image, send or post the images to others, and organize the images.

BRIEF SUMMARY

Several deficiencies have been recognized in the conventional process of marketing materials markup and the existing tools for revising digital documents or media. Generally, the conventional solutions fail to facilitate the collaborative markup of interactive and multimedia materials such as functional websites and individual webpages through an Internet browser or other thin-client interface.

For example, although Dreamweaver™ is a powerful tool for webpage creation and management, it suffers from various inherent disadvantages. For example, it is quite costly to distribute to various team members and complicated to use. It requires a choice between expensive site licenses or limited individual licenses. It also has a steep learning curve, requiring knowledge and understanding of the underlying code, markup languages (such as HTML or XML) and scripts to utilize the software. Additionally, it does not facilitate collaboration or real-time markup by multiple parties with divergent interests and priorities.

Moreover, the Track Changes feature of Microsoft Word™ is tailored to facilitate the creation and review of textual information. Marketing materials, whether on the web or in print, generally involve a variety of content (including, but not limited to text, images, animations, movies, and sounds) and complex interaction between the content and the layout. Thus, the application of Track Changes to text falls far short of the requirements of various reviewers of marketing materials to manage both content and layout through successive revisions.

Additionally, other conventional approaches such as whiteboards do not address the great need for collaborative markup of marketing websites and webpages which not only involve content and layout, but also have interactive aspects embedded within them. Further, blogs and discussion groups are not capable of allowing for an efficient and managed process to collaboratively create a webpage or markup a retrieved webpage. Moreover, conventional approaches relying on individually or site-licensed client software are more difficult and expensive to distribute and manage than a web-browser implemented solution.

The conventional solutions have a variety of other recognized deficiencies. For example, the conventional solutions do not allow for the collaborative markup of complex and interactive digital compositions and materials such as a functional webpages and websites. Further, the conventional solutions do not deal with the markup of functional websites and does not allow users to markup certain items or portions of a webpage so that others can view the markups introduced by the other users. Similarly, the conventional solutions fail to incrementally track or display markups of webpages and contents thereof by various users.

The various disadvantages in the conventional approaches to the markup process of marketing materials have been recognized by the applicants as particularly acute in the context of online marketing in the financial services industry. For example, legal compliance issues related to marketing financial services or products is quite involved due to regulatory disclosure requirements and extensive consumer protection provisions. Furthermore, a crucial aspect of financial services and products marketing is the underlying financial terms, which terms often include an interest rate which varies over time based on a multitude of factors outside the control of the offering financial entity.

As the basis upon which consumers differentiate among financial services and products is quite focused or narrow, it is also imperative that the creation or revision of financial marketing materials, from single pamphlets or websites to entire marketing campaigns across advertising mediums or channels, is accomplished as quickly and accurately as possible. Software licensing costs also become an issue as many of the proprietary offerings are quite expensive to distribute across all the involved departments and inevitably lead to waste as only a subset of the features of the proprietary offerings are required by the various reviewers. Additionally, while some important interested parties may not have expertise in webpage or digital document design, providing a more intuitive and real-time system can unlock their potential to contribute valuable input and advice.

Based on these and other deficiencies in the prior art, there is a need in the industry for annotations of websites to be stored in a copy of the website for audit/retention purposes, for collaboratively marking up a collection of various content items that encompass a fully functional website, to change the layout of the website via a web browser, to bring up any website and associated content, to annotate and/or modify without dependencies on a structured form on platform that is not limited to file manipulation via a Digital Asset Management (DAM) system and does not restrict the technology of the users building or revising a website to allow for adaptation to new technologies with few or no changes on the client side. There is also a need for efficient and enhanced coordination of various reviewing parties ranging from graphic designers to legal compliance to Information Technology specialists. Overall, the conventional solutions fail to include comprehensive web site create, read, update and delete (CRUD) capabilities that enable security, audit trails, site versioning, approvals and promotion to production.

Accordingly, the disclosed embodiments are provided in view of the various deficiencies in the conventional approaches and the need in the industry to provide more efficient and accurate collaboration when creating and revising marketing media. The embodiments described herein are generally directed to systems and methods for allowing real-time and collaborative markup of webpage data by modifying the content and layout as rendered through a web browser.

In one aspect, a computer-implemented method for collaborative markup of digital media is disclosed. An original webpage is retrieved, the original webpage including an original layout and original content. For example, the underlying HTML of the webpage is retrieved. First markup data associated with a first user is received. The first markup data corresponds to a modification of at least one of the original layout or the original content. The first markup data includes a first time stamp, a first user stamp and a first modifier. A first code is generated for rendering a first marked-up webpage based on the first markup data as it is received. Second markup data associated with a second user is received. The second markup data corresponds to a modification of at least one of the original layout, the original content, or the first markup data. The second markup data includes a second time stamp, a second user stamp and a second modifier. Based on the second markup data, a second code for rendering a second marked-up webpage is generated as the markup data is received.

In a second aspect, a computer-implemented method for collaborative markup of a retrieved original webpage is disclosed. The original webpage includes original layout and original content. A first marked-up webpage is rendered based on first markup data. The first markup data corresponds to a modification of the original content or the original layout. The first markup data includes a first time stamp, a first user stamp and a first modifier. Second markup data associated with a second user is generated. The second markup data corresponds to a modification of the original layout, the original content, or the first markup data. The second markup data includes a second time stamp, a second user stamp and a second modifier. Based on the second markup data, a second marked-up webpage is rendered as the markup data is generated.

In an additional aspect, a system for collaborative markup of digital media is disclosed. The system includes a markup server and a database. The markup server is can retrieve an original webpage including an original layout and original content and can receive first markup data associated with a first user. The first markup data corresponds to a modification of at least one of the original layout or the original content and includes a first time stamp, a first user stamp and a first modifier. The markup server can also generate a first code for rendering a first marked-up webpage based on the first markup data and receive second markup data associated with a second user as the markup data is received. The second markup data corresponds to a modification of at least one of the original layout, the original content, or the first markup data and includes a second time stamp, a second user stamp and a second modifier. The markup server can also generate a second code for rendering a second marked-up webpage based on the second markup data as the markup data is received. The database can store the original layout, the original content, the first markup data, the first marked-up webpage, the second markup data, and the second marked-up webpage.

BRIEF DESCRIPTION OF THE FIGURES

The foregoing discussion will be understood more readily from the following detailed description when considered with the accompanying drawings, wherein

FIGS. 14A-14B illustrate exemplary markup notations; and

DETAILED DESCRIPTION

Various disclosed embodiments are generally directed to a system and method of collaborative markup and manipulation of digital media such as webpages. In addition to allowing for real-time markup of any website by a user with a conventional browser, the various embodiments allow for collaboration among several reviewers and the management of their respective markups.

Figure 1:
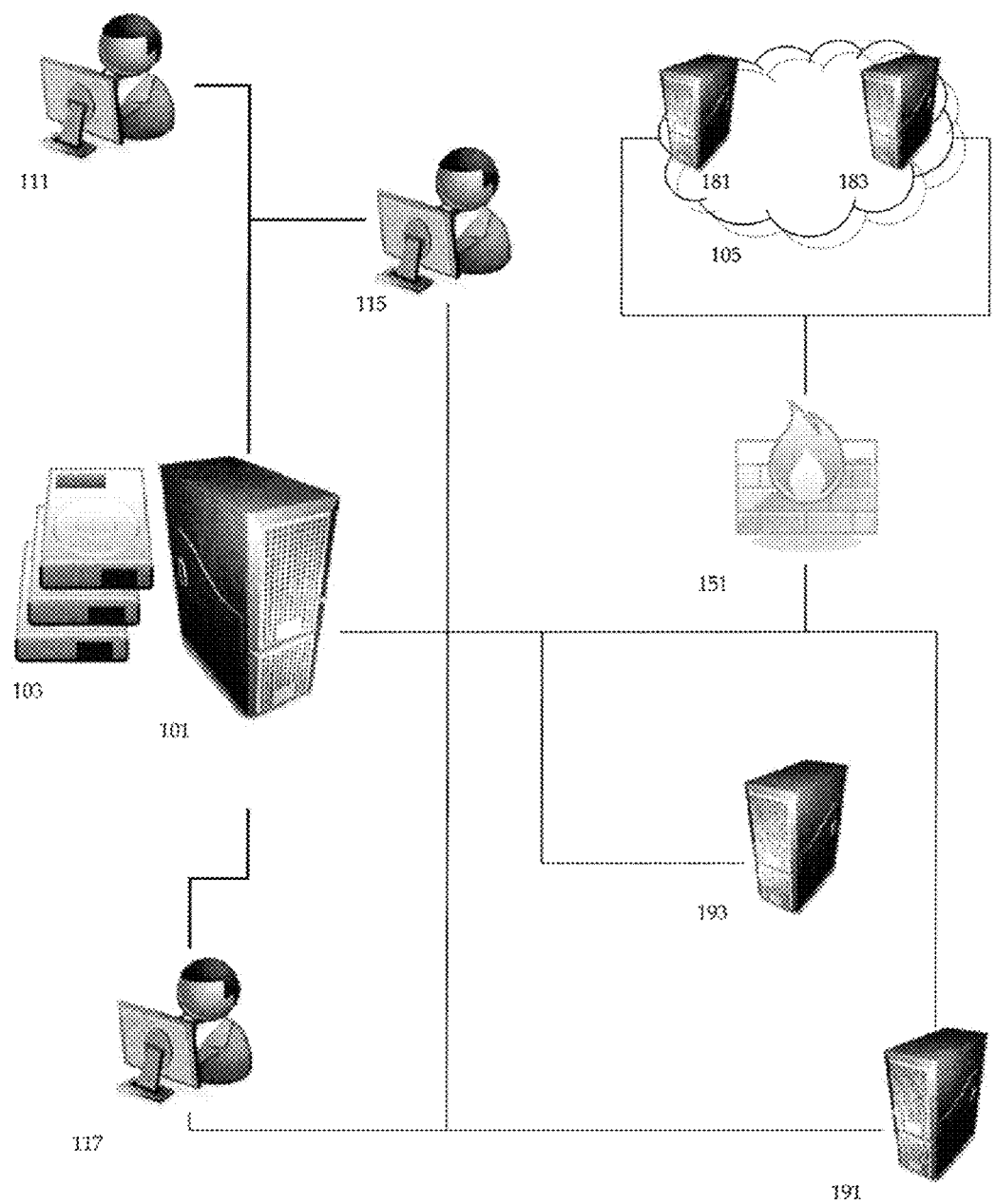
FIG. 1 is a schematic diagram illustrating a system according to an exemplary embodiment.

FIG. 1 is a schematic diagram illustrating a system according to an exemplary disclosed embodiment. The system, or markup tool, includes a markup server 101 and a database 103, the markup server being configured to access the Internet 105 or other external network.

In one preferred embodiment, the markup tool is accessed or employed by users 111, 115, 117 through an Internet browser. The markup tool may be implemented in a variety of suitable forms including, but not limited to, C#, Java, Java Script, C++, Active X in either a .Net Framework for Windows Operating system or a Java framework in a UNIX operating system. The system includes a client application which operates within a client Internet browser and operates similarly on various platforms. Suitable Internet browsers include, but are not limited to, Microsoft Internet Explorer, Mozilla Firefox, Apple Safari, Google Chrome and Opera. Suitable platforms include, but are not limited to Windows/PC, Linux and Apple Macintosh. Preferably, essential markup and display functions are pushed out to the client to limit full page postbacks and reduce page refreshes. Accordingly, a desktop-like application environment can be provided.

In another embodiment, the system, or markup tool, includes the markup server 101, a marketing workstation 111, an audit workstation 115, and a production workstation 117. Exemplary users of the system include marketing (both internal and external), auditing, legal, and Internet production personnel. In another embodiment, the system further includes an external firewall 151 through which external sites for markup 181 may be accessed. The firewall 151 may also facilitate use of the system for markup, review or approval by external marketing partners 183. Other embodiments may include other internal servers for managing related data or functions 193 and servers for website development and maintenance.

In operation, the markup server 101 retrieves or captures an existing or original webpage over the Internet 105. The webpage may also come from an internal source such as another server 193. This webpage generally includes data related to content and layout, where content includes media (including, but not limited to, text, images, animations, sound, video and interactive features such as forms, buttons, embedded programs, links, hypertext, etc.) and layout involves the arrangement of content. Especially in interactive media such as webpages, the webpage also includes data related to the behaviors (for example, when clicked or rolled-over) of the various content and layout components. The content and layout information may be stored in the database 103.

Preferably, the system preserves the functionality of the original website. Alternatively or in addition, the system permits a user or administrator to designate whether an area or items of the website should remain functional during the markup and review process. In such an embodiment, a suspended functionality may be restored upon final review or publication to a web server. Website functionality includes, but is not limited to HTML elements and web objects. HTML elements and web objects include, but are not limited to, hyperlinks, JavaScript, Flash and other animations, Cascading Style Sheets (CSS), forms, buttons, images, video, sound and other MIME-type or plug-in based objects.

As the first user modifies the originally retrieved webpage in real-time on a workstation 111, the markup server 101 receives corresponding markup data associated with the first user and stores it in the database 103. The remote workstation 111 is optionally a marketing workstation. As the first user marks up the captured webpage, code for this modified webpage is generated and transmitted by the server 101 so that these markups are rendered for the first user in real-time on the workstation 111. Preferably, the system does not alter or change the code of the captured original website or webpage stored on the server. Instead, the various markups and modifications are stored in separate files related to the original website. The modified webpage code may be cached in the memory of the server 101. In a preferred embodiment, the modified webpage code is stored in the database 103. The system may also store global information and metadata relating to marked up websites and webpages. Global information includes, but is not limited to, the name of the site (as defined, for example, by a marketing department), the status of the current site and constituent pages related to an expected delivery date for the revised site, an expected or projected launch date, and a revision indication. In one embodiment, a visual representation of all pages of the captured site that have been marked up is provided. The collection of pages may include the pages linked from the originally captured page.

A second user, such as another marketing specialist, legal specialist or auditor, may access the system through another remote workstation 115. Depending on the authorization of users, the second user may make additional modifications or accept or reject the previously applied modifications. The second user's modifications generates a second set of markup data corresponding to the layout, content, or the markup data generated by the previous user. This second set of markup data includes a second time stamp, a second user stamp and a second modifier. This data is also preferably stored in the database 103. Further, as the markup data is generated by the second user, these modifications are also rendered in real-time to the second user. As the second markup data is received by the server 101, the server 101 generates and transmits code for rendering the second marked-up webpage on the workstation 115. In a preferred embodiment, the second or further modified webpage code is stored in the database 103. Furthermore, additional users beyond the first and second users may also participate in the markup and review process. These users may work on the website or webpage in a serial or parallel process.

As the database 103 stores a variety of data reflecting the markup data for modifying the subject webpages, in one embodiment, the server 101 may generate or update an audit trail reflecting the users' markup data including the type, time and user related to the various markups. In another embodiment, IT specialists operating at a production workstation 117 may optimize the final marked-up website and publish it to the Internet or intranet.

Figure 2:
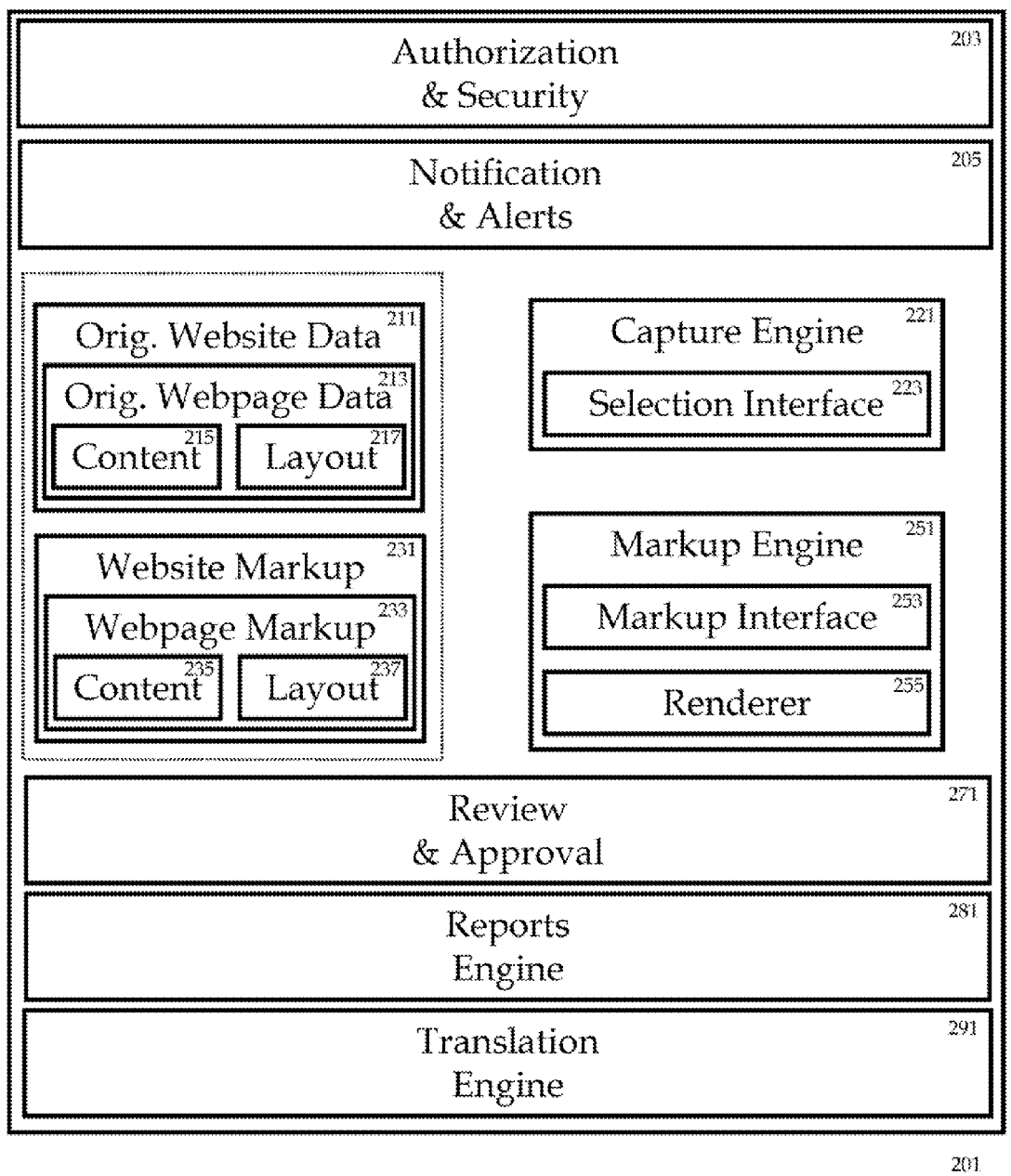
FIG. 2 is a schematic diagram of an embodiment of the disclosed markup tool.

FIG. 2 is a schematic diagram of an embodiment of the disclosed markup tool. It is to be understood that the various depicted modules and functions may be implemented in a variety of different software or hardware forms and according to a variety of suitable computer and network architectures. For example, certain functions may be implemented on the server 101, the client workstations 111, 115, 117 or a combination thereof. In the illustrated embodiment, the markup tool 201 includes an authorization and security module 203, a notification and alerts module 205, a capture engine 221, a markup engine 251, a review and approval module 271, a reports engine 281 and a translation engine 291.

The authorization and security module 203 provides application security accommodating multiple levels of user security or authorization. The application security model may integrate with an organization's existing security and authentications systems. Security may be applied on group and individual levels. In one embodiment, the system provides an interface to allow a user with an appropriate permission level to manage the users and group permissions by, for example, adding users, deactivating users, modifying users, adding groups, deactivating groups and modifying groups. In one embodiment, the system defaults to use the user currently logged into the client machine as the user of the markup application. A different user may also manually log onto the application.

The notification and alerts module 205 allows for other users to be notified when a user has completed markup of a website or portion thereof. Additionally, this module may be used to alert users when a new website has been captured for markup and review. These notifications may take various suitable forms including, but not limited to, emails, automated voice calls and instant messages. This module 205 also generates alerts if there is an issue with the captured website or markup data. For example, a system administrator may be alerted to a corrupted file or to a potentially dangerous executable or script being downloaded or added. The notifications and alerts may also be triggered to notify users of progress in completing the revisions or when certain portions of the webpage have been marked up, reviewed or approved. Additionally, notifications or alerts may be generated if the marked-up website exceeds a certain size or would exceed a predetermined bandwidth limit.

The capture engine 221 enables a user to capture a website or portion thereof for markup by the user or other team members. In one embodiment, the capture engine 221 includes a selection interface 223 that allows for a user to navigate to or otherwise select a website for retrieval or capture from the Internet or intranet. The selection interface 223 facilitates capture by analyzing the structure and contents of the website and generating a visual interface with which a user can select only those portions of the website that are relevant for markup. Based on the indication of the user, the capture engine 221 stores the relevant captured data in, for example, the database 103 attached to the markup server 101. Local versions of this data or portions thereof may also be cached on the remote client workstation. Captured data includes the original website data 211 and original webpage data 213. Webpage data includes original content 215 and layout 217 data.

The markup engine 251 allows for users to mark-up websites and portions thereof using an interface implemented on an Internet browser. The markup engine 251 provides a markup interface 253 to the users to receive the users' markup indications. The renderer 255 allows for users to view the various markup indications represented or reflected with respect to the original website. The markup engine 251 receives user markup data and stores this data in, for example, the database 103 attached to the markup server 101. Local versions of this data or portions thereof may also be cached on the remote client workstation. Markup data includes data representing markups to the original website 231 and to the original webpage 233. Marked-up webpage data includes markups to the content 235 and layout 237.

The review and approval module 271 allows users, such as an auditor or production specialist, to review, supplement, reject, modify or approve a collection of markups to websites that have been generated by the various users. This module may work in concert with the authorization and security module 203 to allow only certain users to view all proposed markups and to review or approve them. This module may also work in concert with reports generated by the reports engine 281, such as exceptions reports identifying conflicting or ambiguous markup indications.

The reports engine 281 allows a user to generate reports describing the markups collaborative generated by a group of users. For example, this report may include an audit trail reflecting users' markup data generated throughout the markup process, the data including the type, time and user related to the various markups. The report may be an indication change report. This report can, for example, serve as a ready work request description for requested changes based on the markups. In one embodiment, the indication change report is available on demand and online after a website is approved. The report may optionally be exportable into a variety of suitable formats. The report may also include a list of conflicting or ambiguous markups (for example, a conflicting insertion/deletion pair of markups) for resolution or reconciliation by an authorized reviewer.

Optionally, a translation engine 291 receives the final markup data after approval and applies the changes to the website. In the case of any remaining conflicting or ambiguous markups, the translation engine may generate a corresponding exceptions list for review by the production personnel or resolve the conflicts or ambiguities according to predetermined rules (for example, giving priority to markups generated by a user with superior permission or security levels). Optimization may optionally take into account the size and loading speed of the website, compatibility with different browsers and other factors affecting an end-user's experience.

Optionally, the system also includes a help function available to a user using the markup tool. In one embodiment, available help topics and help techniques may correspond to the user's security permissions. As a default, the help function may have contextual awareness to provide help for the current page or functions displayed to a user using the browser-based markup tool.

Figure 3:
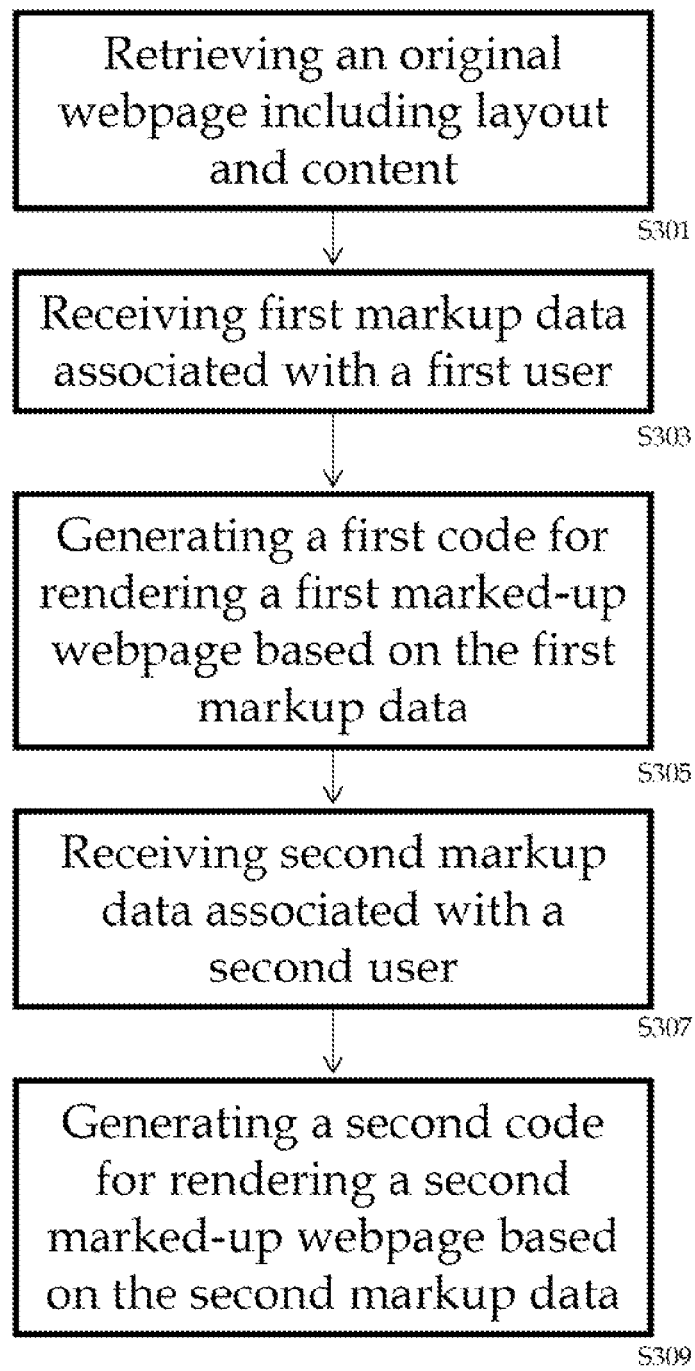
FIG. 3 is a flow chart illustrating a method of marking up a website according to an exemplary disclosed embodiment.

FIG. 3 is a flow chart illustrating a method of marking up a website according to an exemplary disclosed embodiment. A markup server retrieves an original website, individual webpage or portions thereof S301. The original webpage may be retrieved from an internal or external network location. The webpage generally includes original content information and original layout information related to the size, location, or arrangement of the content. Retrieval of the webpage can be done automatically or upon a prompt, for example, by a user. HTML/XML information and, in certain embodiments, the content of the retrieved webpage are stored at the markup server 101 or an associated database 103.

In one embodiment, security mechanisms or the like are employed to detect or prevent the inadvertent or unknowing download of viruses, spyware, or other scripts or executables within the webpage being retrieved. In various embodiments, security features may be implemented at the firewall 151, the server 101 or both.

The server then receives first markup data associated with a first user S303. In certain embodiments, the first user logs in from a workstation 111 connected to the markup server 101. The first markup data reflects a modification by the first user of layout, content, both or any portion thereof. This markup data includes a time stamp indicating a time of modification, a user stamp indicating a user making the modification and a modifier. The modifier includes data describing, controlling or implementing the actual modification of content or layout made by the user. In various embodiments, the modifier may include an indication of an insertion, deletion, format change, color change, resizing, and annotation. Annotations may correspond to industry standard markup notations or proofreaders' marks including, but not limited to, the AP stylebook manual or Adobe, Microsoft and other document editor software markup conventions. Industry standard markup notations include, but are not limited to, delete, close up, caret, insert, space evenly, let stand, transpose, separate, set farther to the left/right, align, begin a new paragraph, set in a certain typeface or case, center, superscript, subscript, wrong font, push down, query or annotate. An non-limiting exemplary listing of symbols is provided in FIGS. 14A-14B, which illustrates an exemplary list of Proofreaders' Marks, including symbols 1401, meanings 1403, and examples 1405, from Merriam Webster. In other embodiments, the modifier may be presented as a set of options for content or layout modifications proposed by the first user.

One embodiment of the markup tool can be configured to effect the indicated change to the underlying website in real time. This feature allows non-technical personnel to create and modify a website by effectively copying and changing the files all through a web browser. The exemplary illustrations in FIGS. 13A-13J illustrate how an embodiment of the markup tool modifies the respective HTML. Once the changes are made and the "new" website was complete, it can be published back to the original source or to another location. This can advantageously shorten the time it takes to build out a new site, and may be extended to ASP- and ISP-types of businesses to allow customers to lawfully copy a site and the structure of a site to use as a template.

The various modifications to content and layout are viewed in real-time by the editing user. These modifications further do not require coding or editing of underlying HTML/XML; instead, well known input methods such as clicking, dragging and editing of actual content (such as text) is used to accomplish the modifications. For example, text may be added, deleted or formatted with tools similar to those in word processing programs. In another example, an image may be resized by clicking and dragging on an edge of the image or moved by dragging and dropping.

Based on the first markup data, a first code is generated to render a first marked-up webpage as the markup data is received S305. Accordingly, the first user can view markups in real-time.

The markup server then receives second markup data associated with a second user S307. The second markup data reflects a modification to the original layout, the original content, and/or the first markup data. The second markup data includes a second time stamp, a second user stamp and a second modifier. In various embodiments, the second modifier may be an indication of an acceptance or rejection of the modification (or portion thereof) proposed by another user. The second modifier may also include an indication of an insertion, deletion, format change, color change, resizing, and annotation.

Based on the second markup data, a second code is generated to rendering a second marked-up webpage as the markup data is received S309. Accordingly, the second user can view markups in real-time.

In one embodiment, the second user is notified that the first marked-up webpage was generated. This notification may optionally be in the form of an email upon a request by the first user. Alternatively, the notification may be based on a schedule or customizable workflow which manages the order with which reviewers generally markup the marketing materials.

In another embodiment, the code of the second marked-up webpage is optimized for Internet distribution and the optimized version of the second marked-up webpage is published. This may be performed by the Internet production personnel at a production workstation 117 after an auditor is satisfied that the webpage marked up by previous users reflects the desired finished product. Alternatively, optimization may be performed by a translation engine 291 of the system illustrated, for example, in FIG. 2.

In an exemplary embodiment, a user on the marketing workstation may access the markup server through a web browser to comment on or make edits to the retrieved website. Additionally, a user on the production workstation may view markups left by marketing and perform the corresponding changes in website development. A user on the audit workstation may then validate changes in the website made using the markup tool against development or production.

As various users access and/or modify the retrieved website, an embodiment of the system generates or retains an audit trail. The audit trail tracks, for example, the source, time, and substance of comments and changes made to the website. In one embodiment, trail reports may be generated to arrange the markup data in a format which makes for quicker overall review by an auditor. Suitable data retention, check-out and security procedures allow for storage and access management on the markup tool server 101 and database 103 and any other related system component. In one embodiment, the system assigns an authorization level to at least a portion of the original layout or the original content. The first markup data or the second markup data is then restricted based on the authorization level.

Figure 4A:
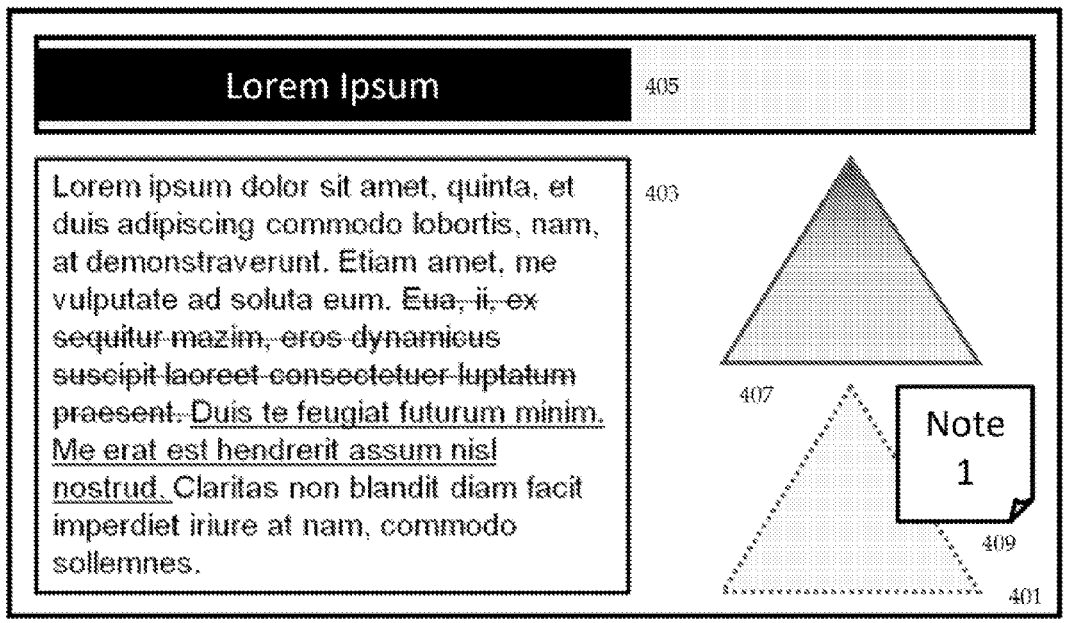
FIGS. 4A & 4B illustrate rendered views of a first marked-up webpage according to an exemplary embodiment.
Figure 4B:
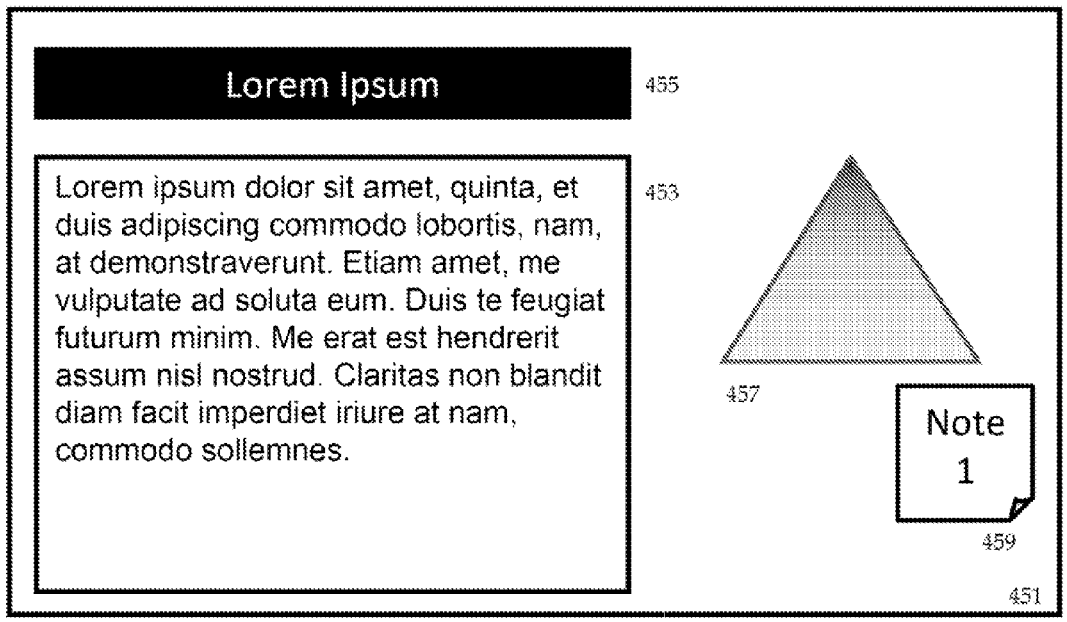

FIGS. 4A and 4B illustrate rendered views of a first marked-up webpage according to an exemplary disclosed embodiment. FIG. 4A illustrates a marked-up view 401 with indications of the modifications introduced by a first user. Selecting among and introducing the various markups and comments may be accomplished through use of toolbars and menus as described and depicted elsewhere in this disclosure. FIG. 4B illustrates a finalized view that shows only the resultant product of the modifications 451. Users may optionally be provided with the ability to toggle between these two views.

A user can leave comments (for example, by leaving a sticky-note 409), edit 403 and reformat text, and rearrange the layout of the website 405, 407 and its constituent parts. For example, the size of various images can be changed, rotated, resized or moved by holding SHIFT while dragging with the mouse. In alternative embodiments, other aspects such as animations or video requiring proprietary playback software may be replaced by an informative placeholder for commenting. As described elsewhere, changes in content or layout are preferably reflected in real-time. The changes or modifications are also annotated, thereby creating a detailed audit trail including who made which change, when the change was made, and whether the change was accepted. Additionally, the audit trail can accommodate permissions and security features to restrict viewing of certain changes or preventing certain aspects from being changed.

Figure 5A:
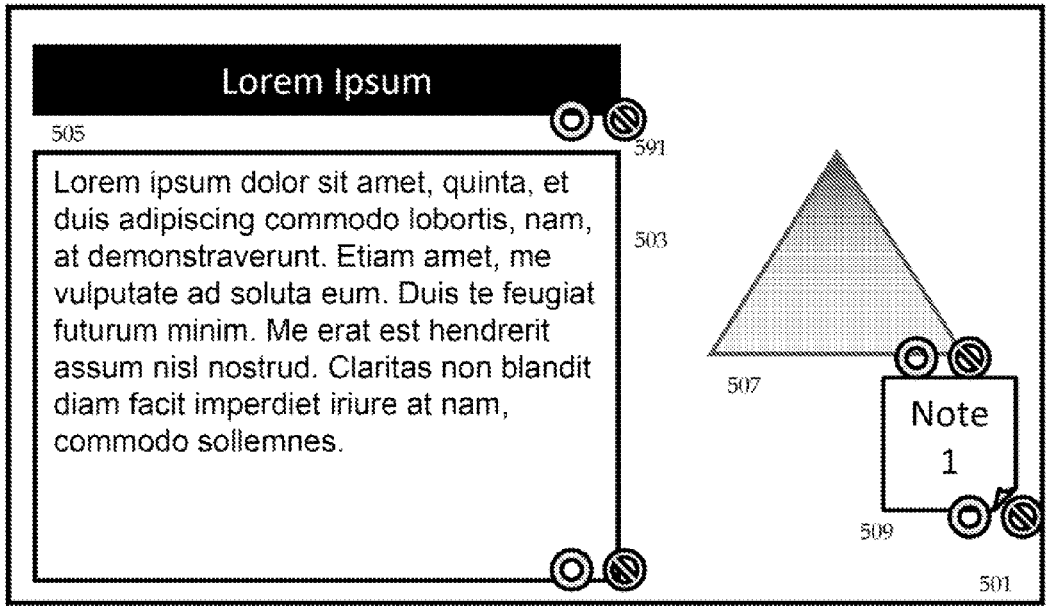
FIGS. 5A & 5B illustrate rendered views of a second marked-up webpage according to an exemplary embodiment.
Figure 5B:
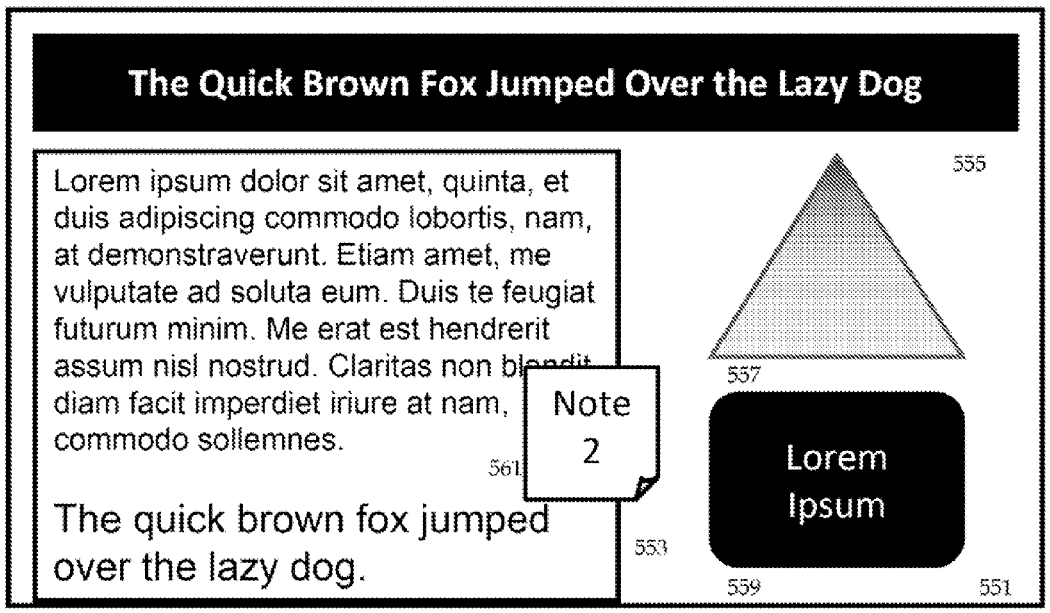

FIGS. 5A and 5B illustrate rendered views of a second marked-up webpage according to an exemplary disclosed embodiment. FIG. 5A illustrates a modified view 501 with indications of the modifications introduced by a previous user. FIG. 5B illustrates a finalized view 551 that shows only the resultant product of the acceptances, rejections, and modifications of the second user. As in FIGS. 4A and 4B, users may optionally be provided with the ability to toggle between or customize views to gain a better understanding of the markups previously made and the final product emerging from a user's particular markups. A subsequent user may also be presented with the option of viewing markups in the marked-up view similar to that illustrated in FIG. 4A.

The second user may be presented with the option 591 of accepting or rejecting a change made by another user. The previous user may also have provided two options for the next reviewer to select from. In certain instances, the second user may reject a previous modification 555 or introduce additional modifications 553, 559 and annotations 561. Additionally, notes 509 may be acknowledged or cleared by a subsequent user.

Figure 6:
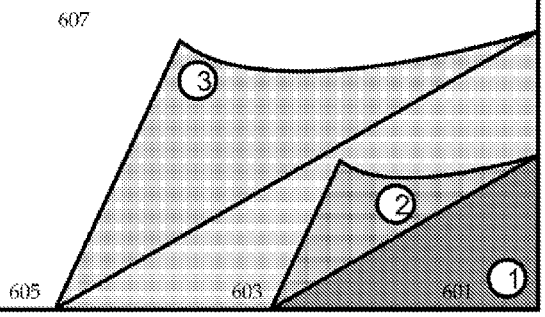
FIG. 6 illustrates a rendered view of a third marked-up webpage according to an exemplary embodiment.

In one embodiment, the system generates a third code for rendering a third marked-up webpage including a comparison view of the first and second marked-up webpage. Certain embodiments also include a "virtual flipbook" function which enables reviewers to flip through various versions of the edited website in a manner analogous to physically flipping through a stack of printed images. FIG. 6 illustrates a rendered view of a third marked-up webpage 605 according to an exemplary embodiment. The comparison view simultaneously shows at least a portion of the first marked-up webpage 601 and at least a portion of the second marked-up webpage 603. Suitable effects such as variable transparency between content or layouts of different marked-up webpages 607, 609 are optionally implemented to enhance the user experience and understanding of the markup process as a whole. In one embodiment, the virtual flipbook is adapted from the audit trail.

Figure 7A:
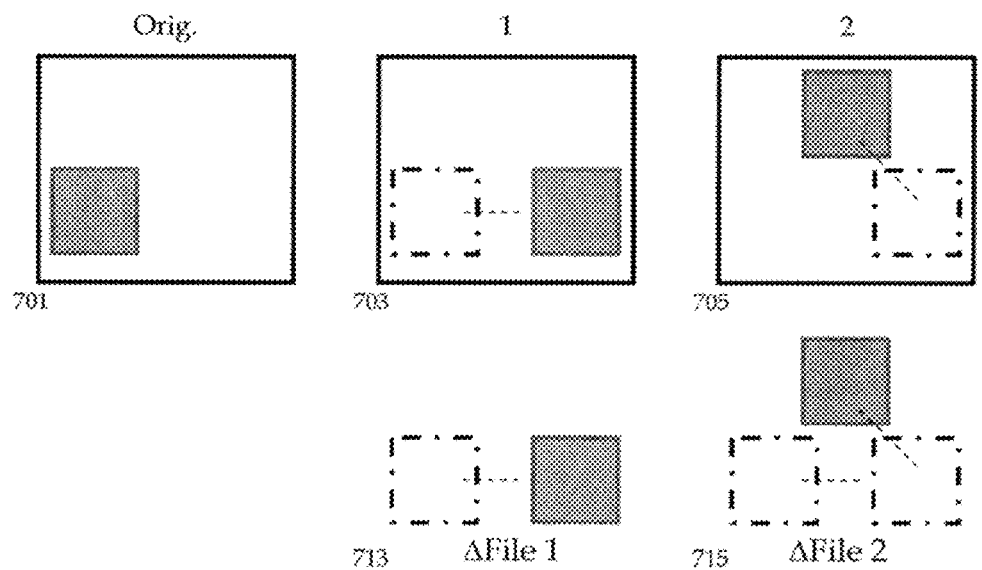
FIGS. 7A & 7B are schematic diagrams illustrating exemplary embodiments including delta files corresponding to markup data.
Figure 7B:
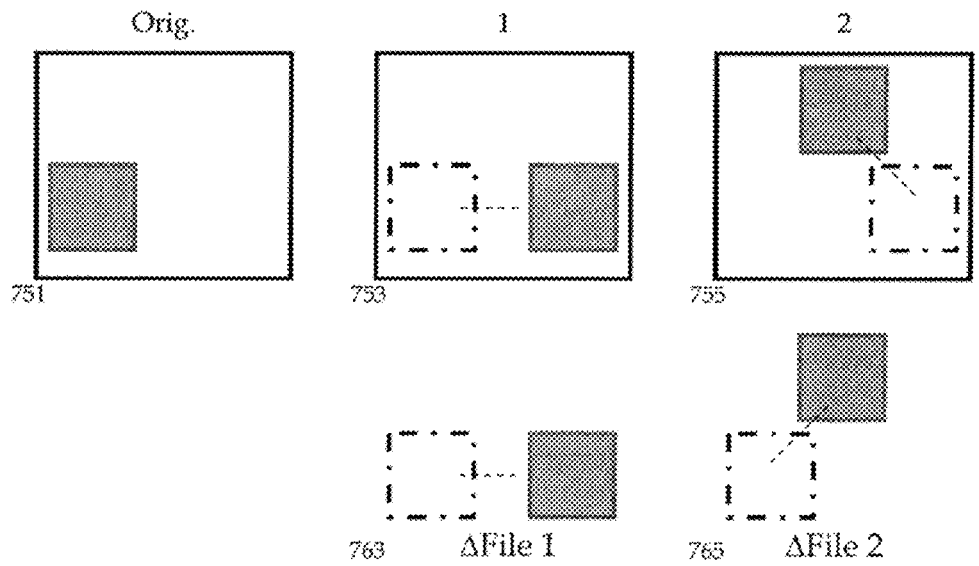

FIGS. 7A & 7B are schematic diagrams illustrating an exemplary disclosed embodiment including delta files corresponding to markup data. In these illustrations, an image in the webpage 701, 751 is being moved in real-time two times—once to the right and once more to the top-center. In one embodiment, when a first code for rendering a first marked-up webpage 703 is rendered, a first delta file 713 is generated. The first delta file represents the formatting or content "difference" between the original 701 and the first modification 703. In another embodiment, generating a second code for rendering a second marked-up webpage 705 includes generating a second delta file 715 corresponding to the second markup data and the original webpage. For example, in making a second change (whether by a second user or the same user in sequence), a second delta file 715 is created. The second delta file 715 represents the formatting or content "difference" between the second modified webpage 705 and the first modified webpage 703. In an alternative embodiment, the second delta file 765 represents a content or layout difference between the original webpage 751 and the second modification 755. This implementation of delta files is concerned about the original state and the end state. In one embodiment, a final acceptance or rejection of a markup by, for example an auditor, prompts the generation of the second type of delta file 765 from the highly incremental types of delta files 713, 715.

Although the illustration represents the delta files 713, 715, 763, 765 as separate from the webpage or markup data, it is understood that the delta files may also be embedded (for example, as inline but commented-out HTML/XML or other meta-data format) or otherwise reflected in the webpage data or markup data. The delta files advantageously provide for increased granularity and meta-data efficiency in the audit trail so the character, time, sequence and user of each modification or markup can be recorded and effectively managed.

With the coupling of a Digital Asset Management system, embodiments of the markup tool includes preview capabilities for all files that it manages. A user may "Scroll" through thumbnails images of sites, pages within sites and all versions of each distinct object. The preview capability is a new way to apply asset management structures to a holistic website and all associated changes to that website. Embedded in this approach is a strong change management structure.

Figure 8:
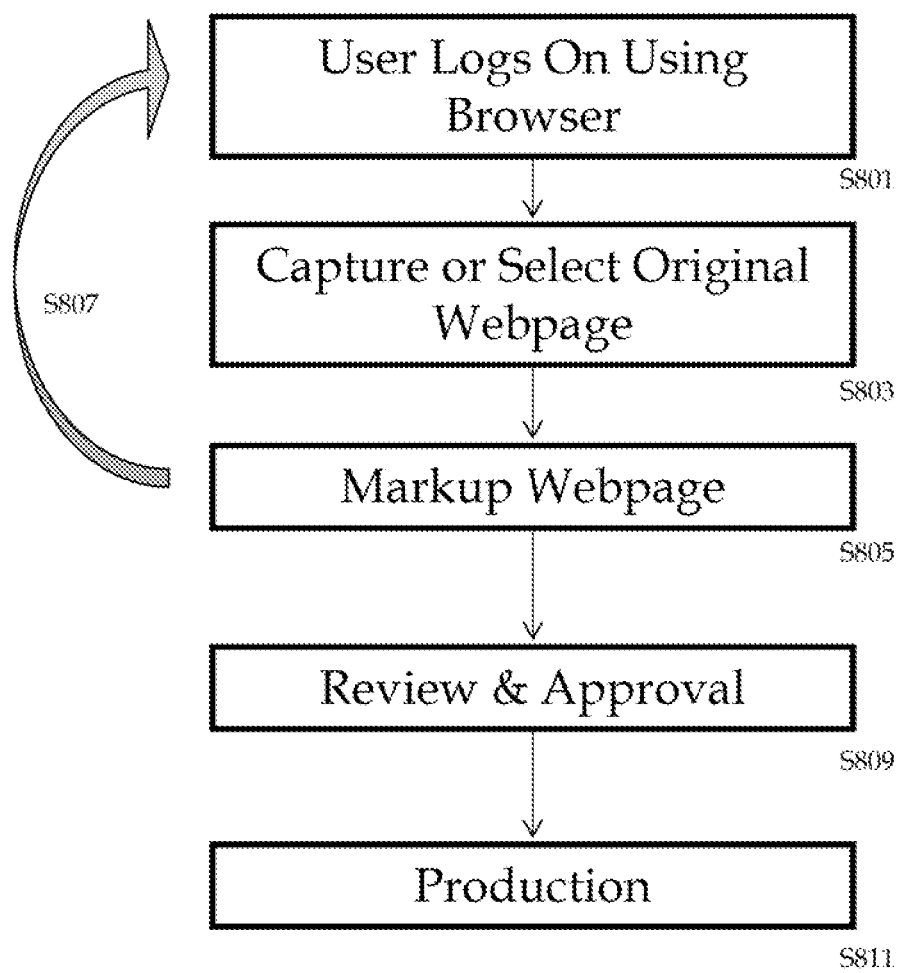
FIG. 8 illustrates a flow chart describing a method according to another disclosed aspect.

FIG. 8 illustrates a flow chart describing a method according to another disclosed aspect. Using a browser, a first user logs onto the system and the markup tool is started within, for example, a local Internet browser with the appropriate access and permission levels S801. The user then initiates the markup process by capturing a desired website or webpage or selecting a previously captured website S803. The user then marks up the captured website or webpage using an interface provided by the markup tool S805. In particular, the user drags and drops icons from a toolbar onto the precise portions or items of the website for which a markup is desired. Once the user is finished marking up the website, subsequent users may markup the website S807. These users may be notified that their input is required or requested by, for example, an email or instant message notification. Depending on their authorization levels, these subsequent users may view other users' markups and accept or reject the indicated markups. Once the various users have marked up the website, the various markups may be reviewed and either approved, rejected or further modified S809. After the marked-up website or portions thereof are approved and finalized, the website is sent to production S811 for publishing to the Internet or intranet.

Figure 9A:
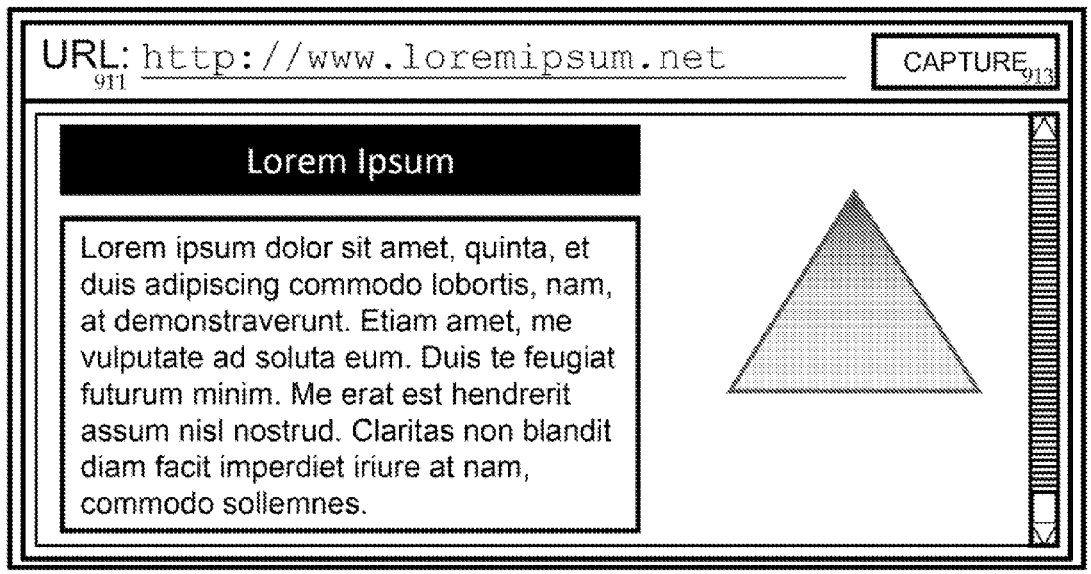
FIGS. 9A and 9B illustrate an exemplary embodiment of a website capture and selection interface.
Figure 9B:
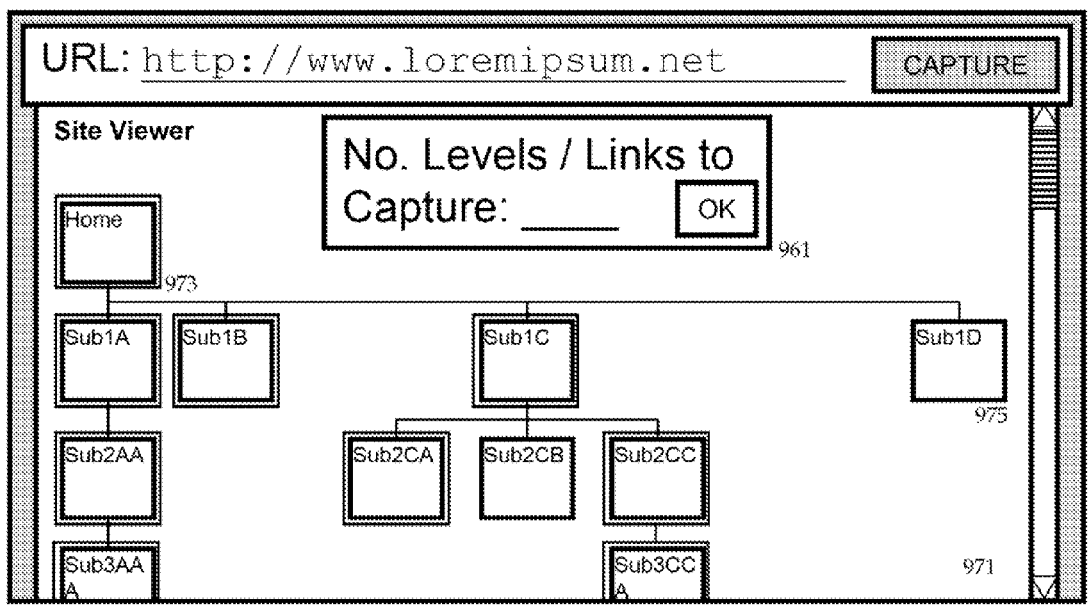

FIGS. 9A and 9B illustrate an exemplary embodiment of a website capture and selection interface. The interface allows the user to select a website or portion thereof for capture and subsequent markup. For example, a user may use a capture interface 901 input a URL 913 for, or otherwise navigate to, a desired webpage and click a "capture" button 913 to initiate the capture of the website. In one embodiment, only users or administrators with an appropriate permission level may capture a website or individual webpage for markup. Additionally, all or certain portions or items of the capture website may be designated for protection from markup. For example, in a webpage for marketing a consumer credit product, the Terms and Conditions may be protected from markup. Designation of protected portions may be indicated by the capturing user or by an administrator or team leader.

As that illustrated in FIG. 9B, a selection interface 951 may be provided. Upon selecting a website or webpage to capture, the selection interface 951 may prompt the user to select a number of directory or page levels to capture 961. Alternatively or in combination, the selection interface 951 includes a Site Viewer 971 visually representing the structure and contents of the selected website's site directory. Using the Site Viewer, the user may click on the various constituent webpages to indicate whether the page should be selected for capture 973 or not 975. Optionally, the user may also be prompted whether to download certain layout information, content or both from each site or page.

Figure 10A:
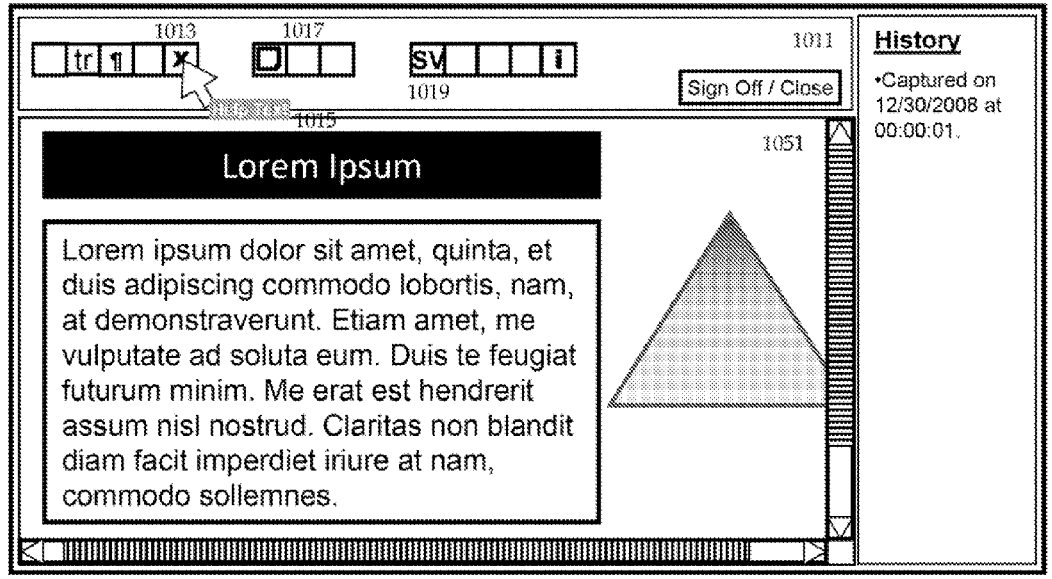
FIGS. 10A and 10B illustrate an exemplary embodiment of a markup interface and rendered markups.
Figure 10B:
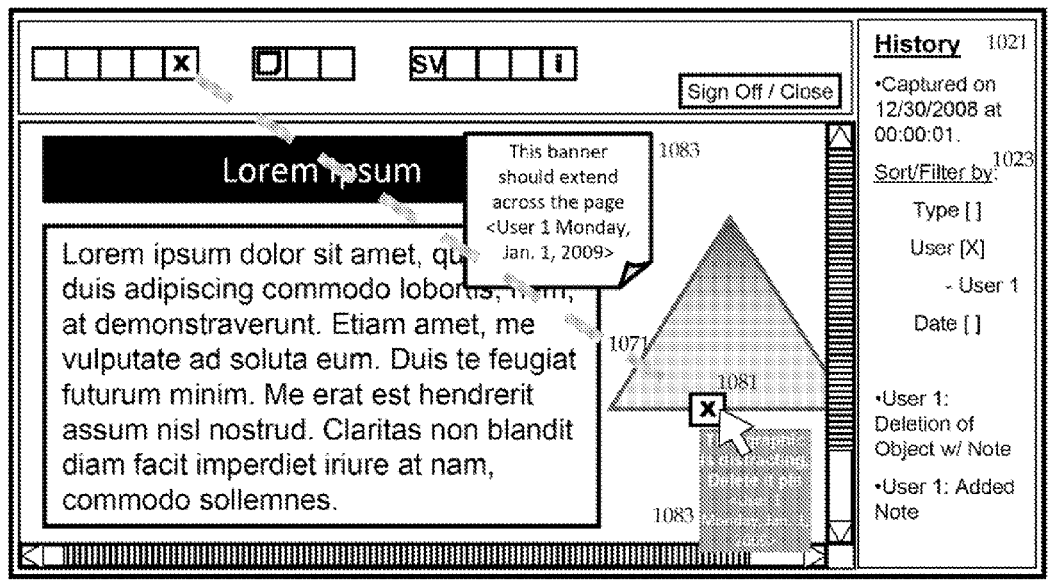

FIGS. 10A and 10B illustrate an exemplary embodiment of a markup interface and rendered markups. In a preferred embodiment, the markup interface 1001 includes a toolbar or toolbars 1011 that includes representations or icons 1013 of the various indications that may be applied to mark up a website. The webpage being marked up is rendered in real-time for the user in a workspace window 1051. To facilitate ease of understanding and use, the markup icons preferably correspond closely to industry standard markup notation and/or current PDF notation so they are identifiable by function. Examples of markups for which icons may be provided include, but are not limited to, insert, delete, crop, reformat, resize, comments, transpose, align, etc. Various markup or proofreading conventions may be used and reflected in the toolbar. FIGS. 14A and 14B provides an exemplary listing of markup symbols. In one embodiment, a user may customize the content and arrangement of the icons on the toolbar.

Groups of icons 1017 may correspond to categories or types of markups. Additionally, hovering over an icon may display help text 1015 to help an unfamiliar user identify the purpose of the icons. Optionally, the icon is associated with a text string associated with the indicated markup. The text string is predetermined and may be customizable by the user to further describe aspects of the desired markup being indicated.

Preferably, the user associates a selected markup icon from the toolbar with any unrestricted item within the captured website or webpage. This may be accomplished, for example, by dragging a particular icon onto the desired position of the webpage 1071. Dragging the icon allows for precise positioning of the markup indicator. Alternatively or in combination, the user may first click the icon to select the markup feature and then click or select within the webpage to designate a particular area or item for markup. The desired markup may be indicated on the webpage in real-time by an icon 1081 (for example, a miniature version of the selected markup icon) or highlighting. Optionally, this indication is hidden until the user rolls over the marked-up area with the mouse. An identification of the user and a date time stamp may also be displayed 1083. This identification may also be hidden until rollover. Further, all the previous markups by one or more users may be revealed simultaneously or selectively according to, for example, the user that made the markup, the type or category of markup or the time the markup was added or modified. Markups on the website or webpage can generally be removed by the user that made it. Optionally, other users with an appropriate security level may also remove another's markup.

The ability to add comments is also supported. Comments 1083 may be selected from a predetermined list or customized by a user ("free form"). In one embodiment, a user's ability to use, access and see custom comments may be controlled based on security and authorization level. For example, the ability to include free form text in a comment can be controlled according to the business need. Additionally the ability to turn the custom comments feature on or off may be accomplished in the security module. A user may select or deselect comments by groups or by individual users.

In one embodiment, markups may be indicated for Flash and other multimedia objects. Optionally, markups are associated with the object on an object or frame-by-frame basis. The markup indicator may also store the associated frame number. In one embodiment, to facilitate markup of such objects, a progress bar and frame number may become visible when the user rolls over the object with the mouse. In various embodiments, markup functionality operates on all linked pages of a captured website without losing markups made on a previous page. For example, clicking on a link within a page will allow markups to be applied to the linked page without losing markups associated on the originating page.

In one area of the user's display, a history tablet 1021 is provided. The history tablet displays markups associated with the site or page being viewed. In one embodiment, the history tablet displays the type or category of the markups, the corresponding dates and times, user and associated markup text. Optionally, the grouping of markups in the history tablet may correspond to the groupings of markup type or category in the toolbar. The history tablet may display the markup information in table form and give the user the ability to sort 1023 the table by markup type/category, user or date. Data in the history such as user and date is the same as that displayed, for example, when a user hovers over a markup indicator on the webpage. When the user is done (completely or temporarily) providing markups or comments, the user may sign or log off the system or otherwise make the webpage available to other users. Users can navigate to markup a different page or portion of a captured website using another Site Viewer interface 1019. Thus, markups of entire bundled pages or websites can be accomplished.

The system also may allow for a user to customize the work area of the browser interface including, for example, the toolbar 1011 and the history tablet 1021. For example, default toolbars may be selected and the toolbars and history tablet may be docked, undocked, expanded or minimized. In one embodiment, the system allows users to save their preferences for future use on the user machine or to return to the default preferences. The saving of preferences may be done using a file stored locally on the client and/or a configuration file stored on the server remote from the client.

Figure 11:
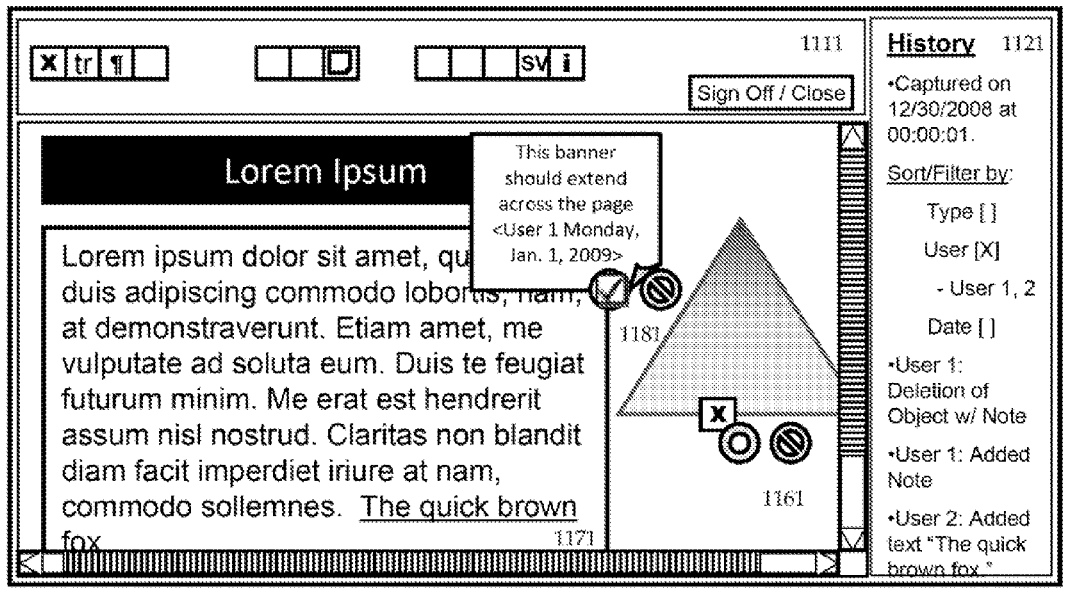
FIG. 11 illustrates a markup interface as viewed by a subsequent user.

FIG. 11 illustrates a markup interface as viewed by a subsequent user. In the illustrated embodiment, a second user marks up a website after a first user has submitted markups. In this example, the second user has customized the toolbar layout 1111 to be different from that of the first user. This second user has also added text 1171 to the webpage and indicated agreement with a comment left by the previous user 1181. Generally, as the illustrated second user has authorization through the security model to accept, reject or modify the previous user's markups, appropriate buttons 1161 associated with the previous user's markups are available, for example, upon rollover or hover. Additionally, the history 1121 lists the various markups introduced by the first and second user.

Figure 12:
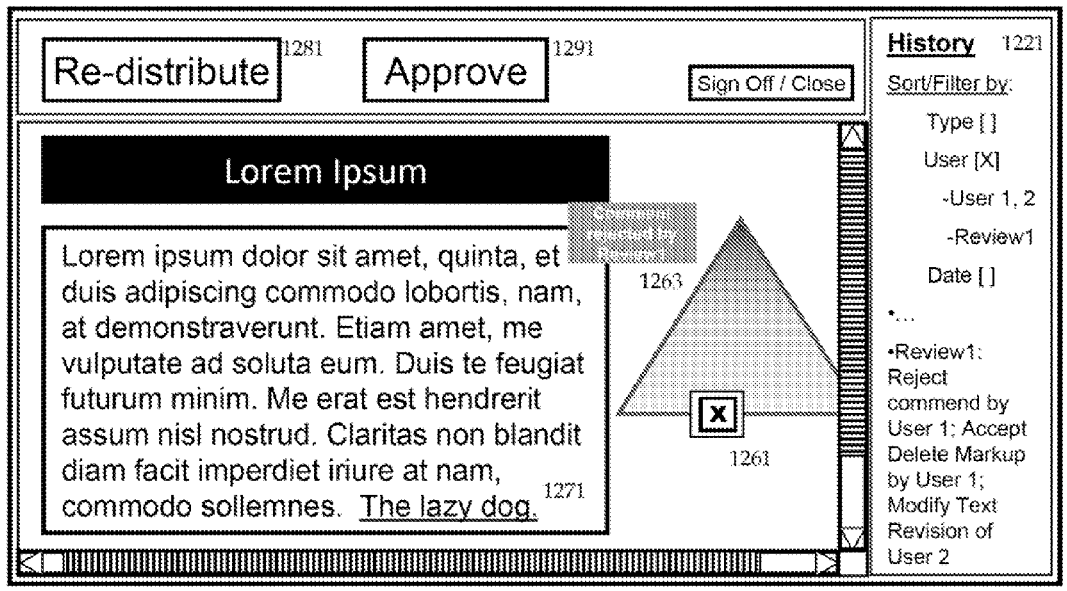
FIG. 12 illustrates an exemplary embodiment of a review and approval interface.

FIG. 12 illustrates an exemplary embodiment of a review and approval interface. In the illustrated embodiment, the markup tool provides signoff, approval and revision functionality to users. In one embodiment, the application has multiple levels of signoffs or acceptances for markups. A virtual signature or indicator of signoff may be input by different groups making or viewing markups. The ability to signoff or approve on one or more indicated markups is optionally restricted according to permission levels handled by the security module. In the illustrated embodiment, the reviewer may sign off or approve of one or more revisions by clicking a corresponding button 1261. The ability to signoff on one or more indicated markups may be restricted according to permission levels handled by the security module. Additionally, a reviewer may chose to redistribute the webpage to the users for further markup or revision 1281.

In the illustrated example, the reviewing user rejected the comment by the first user and approved by the second user 1263. The reviewer also signed off on or approved the deletion indicated by the first user 1261. Additionally, the reviewer modified the markup to the text by the second user 1271. These markups are all reflected in the searchable and sortable history 1221. Further, the history interface allows for selective viewing or filtering of markups by type, user and date. This feature allows a reviewer to view the markups indicated from various perspectives. It also allows, for example, a reviewer to spot and reconcile deletions or modifications to existing markups by previous users.

The system may also allow for approval to be indicated 1291 by protecting or locking the site against later markups. In one embodiment, the system allows one level of approval per marked-up website. Upon approval, a new revision indicator may be assigned to the marked up website. In the case that the reviewer signing off is not a final reviewer, this may trigger notification to the next level of reviewer that the project requires his or her attention. The approved revisions are stored and accessible to users with sufficient permissions. As a default setting, a user may review previous revisions but not make additional markups to a previously approved revision. In one embodiment, approval locks the page against subsequent revisions by any users. Alternatively, the page is locked against subsequent revisions by users below a certain security or authorization level.

Figure 13A:
FIGS. 13A-13J illustrate yet another exemplary embodiment of the markup tool.
Figure 13B:
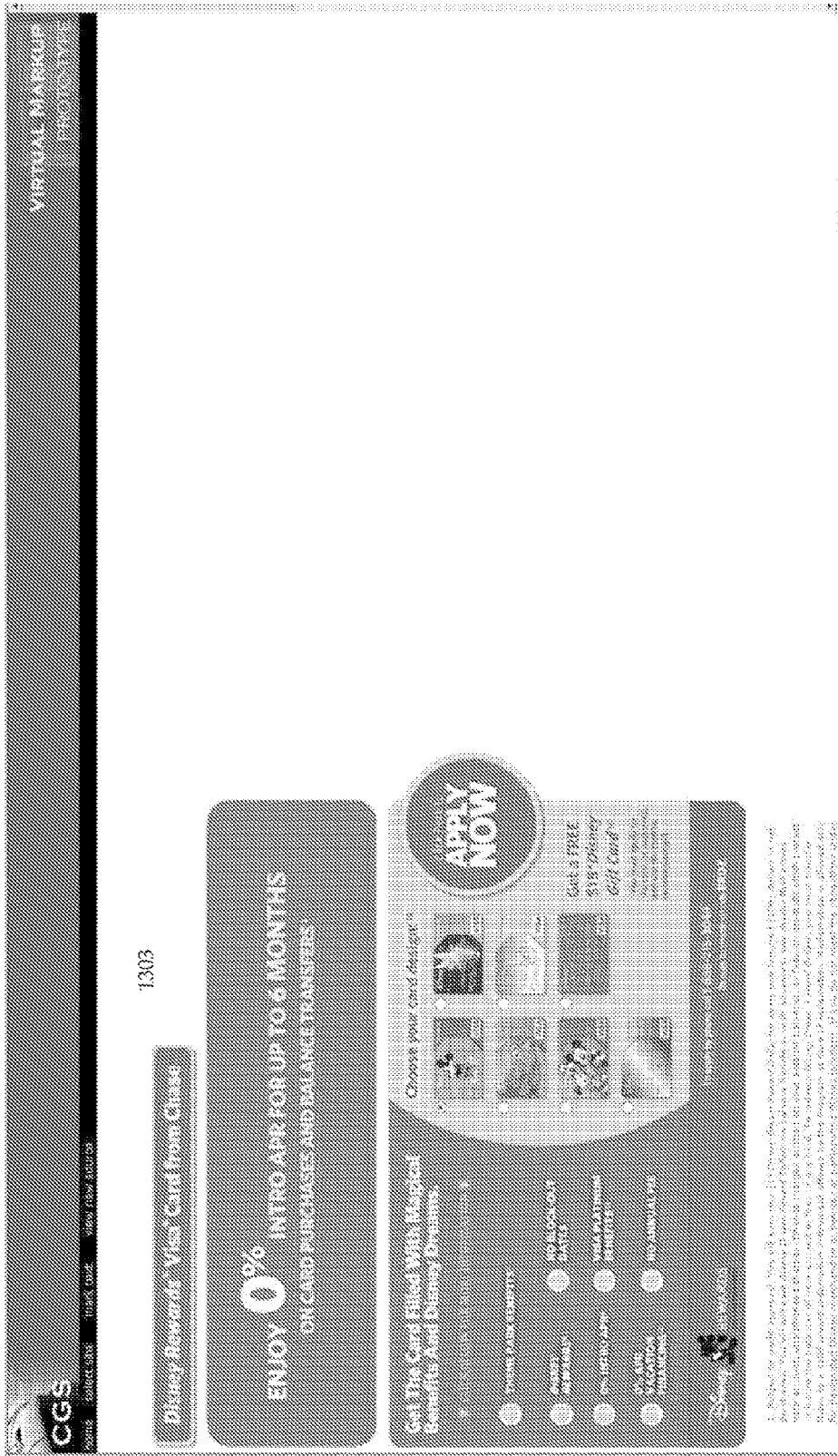
Figure 13C:
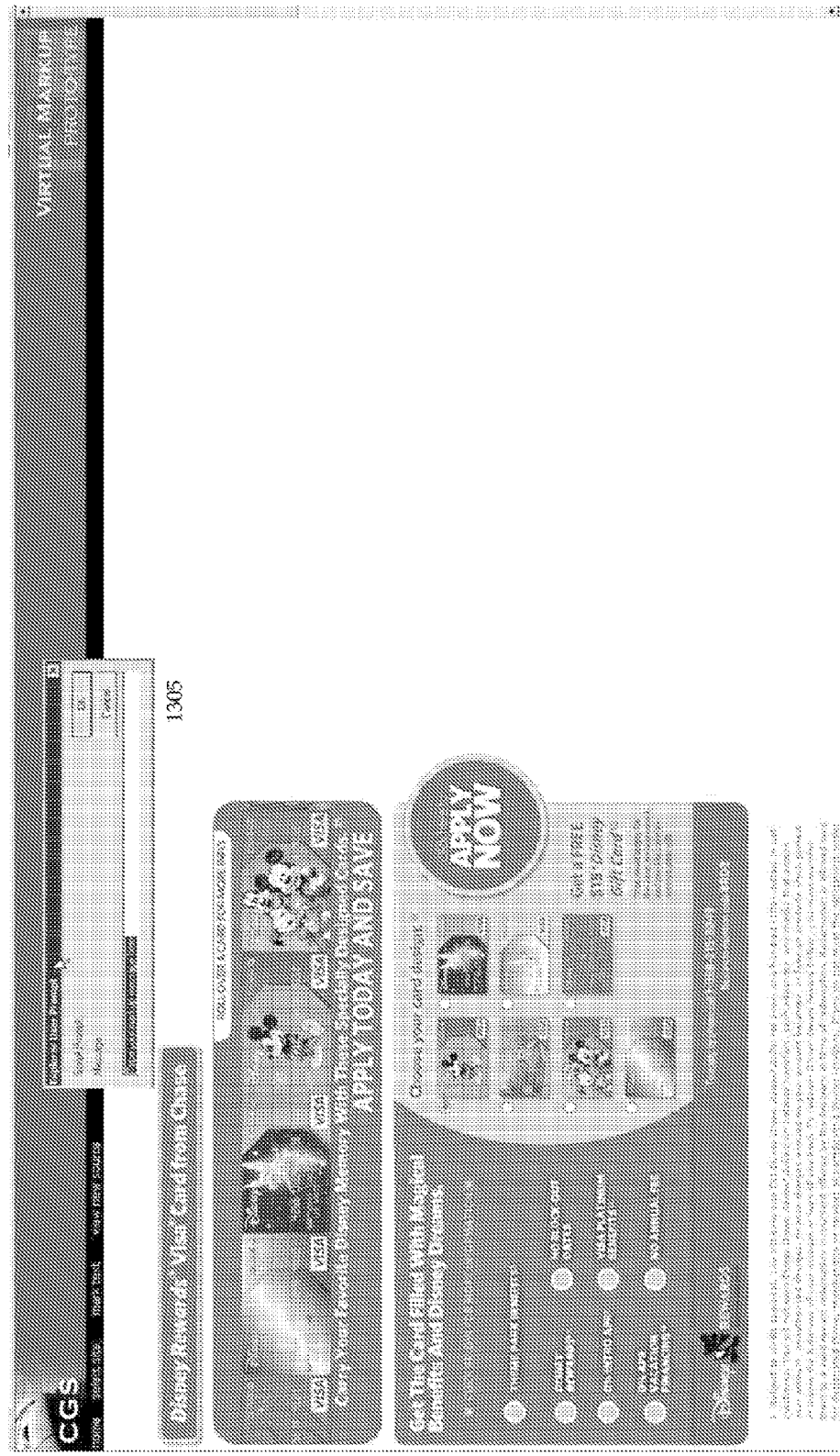
Figure 13D:
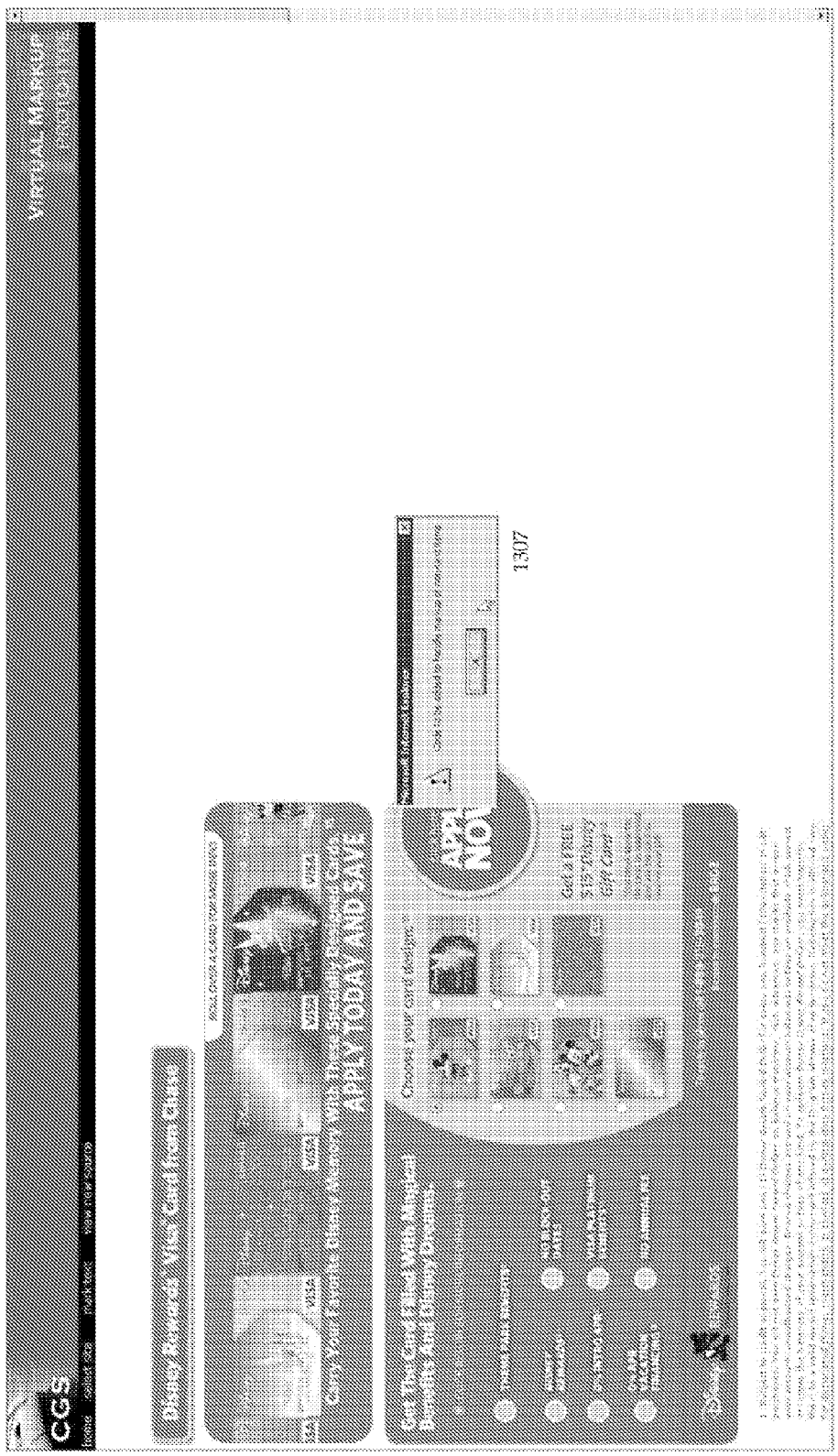
Figure 13E:
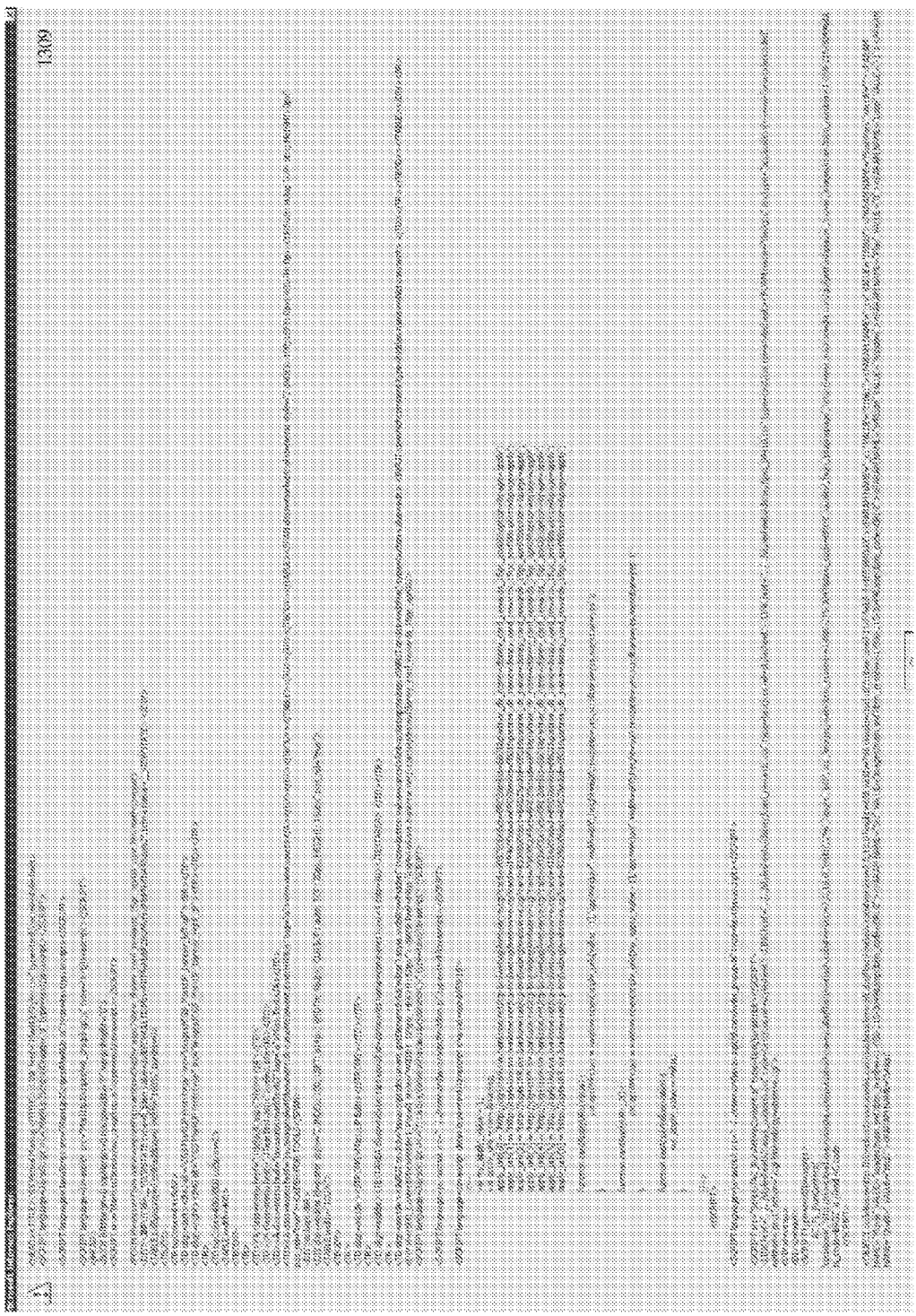
Figure 13F:
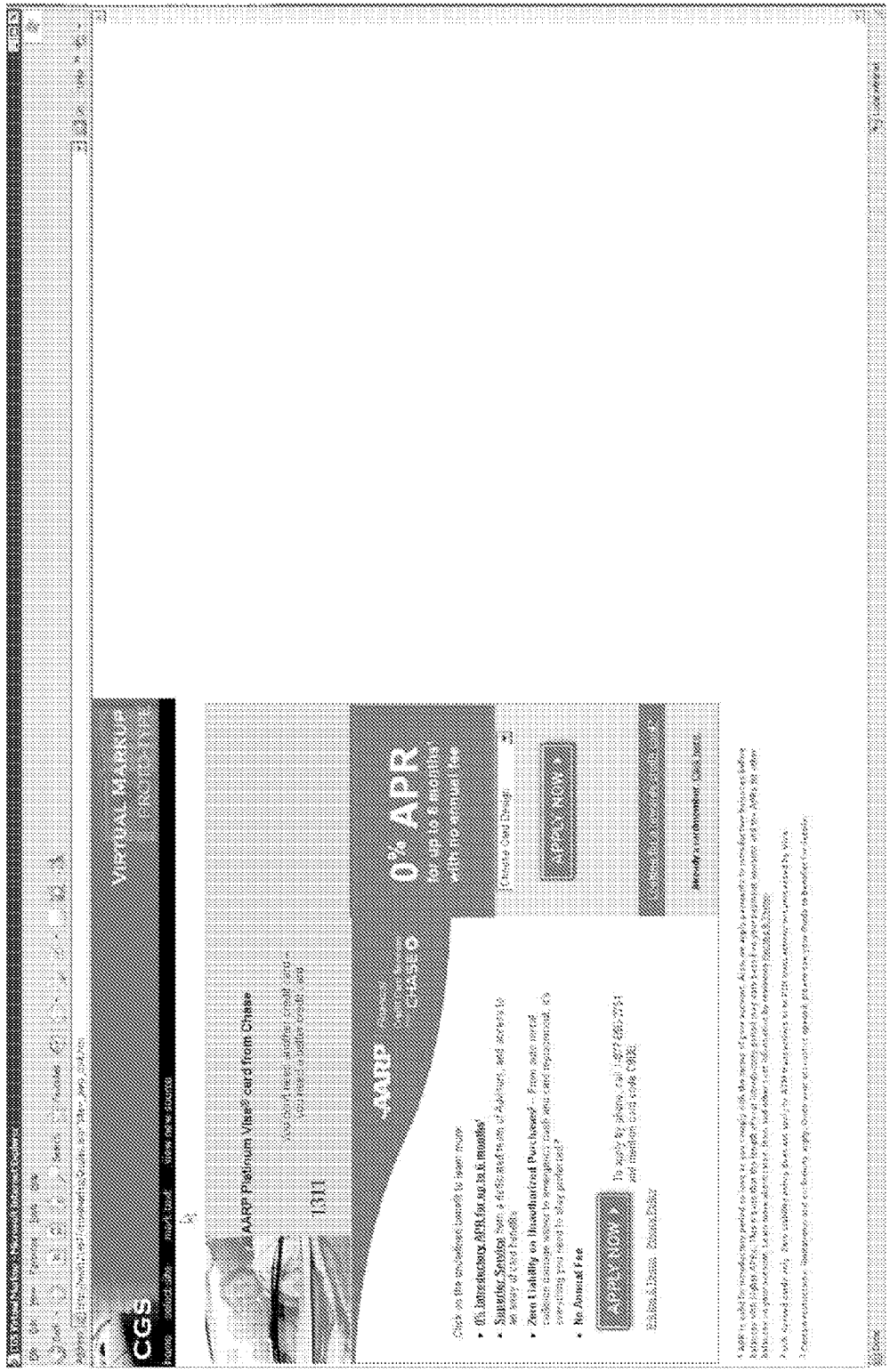
Figure 13G:
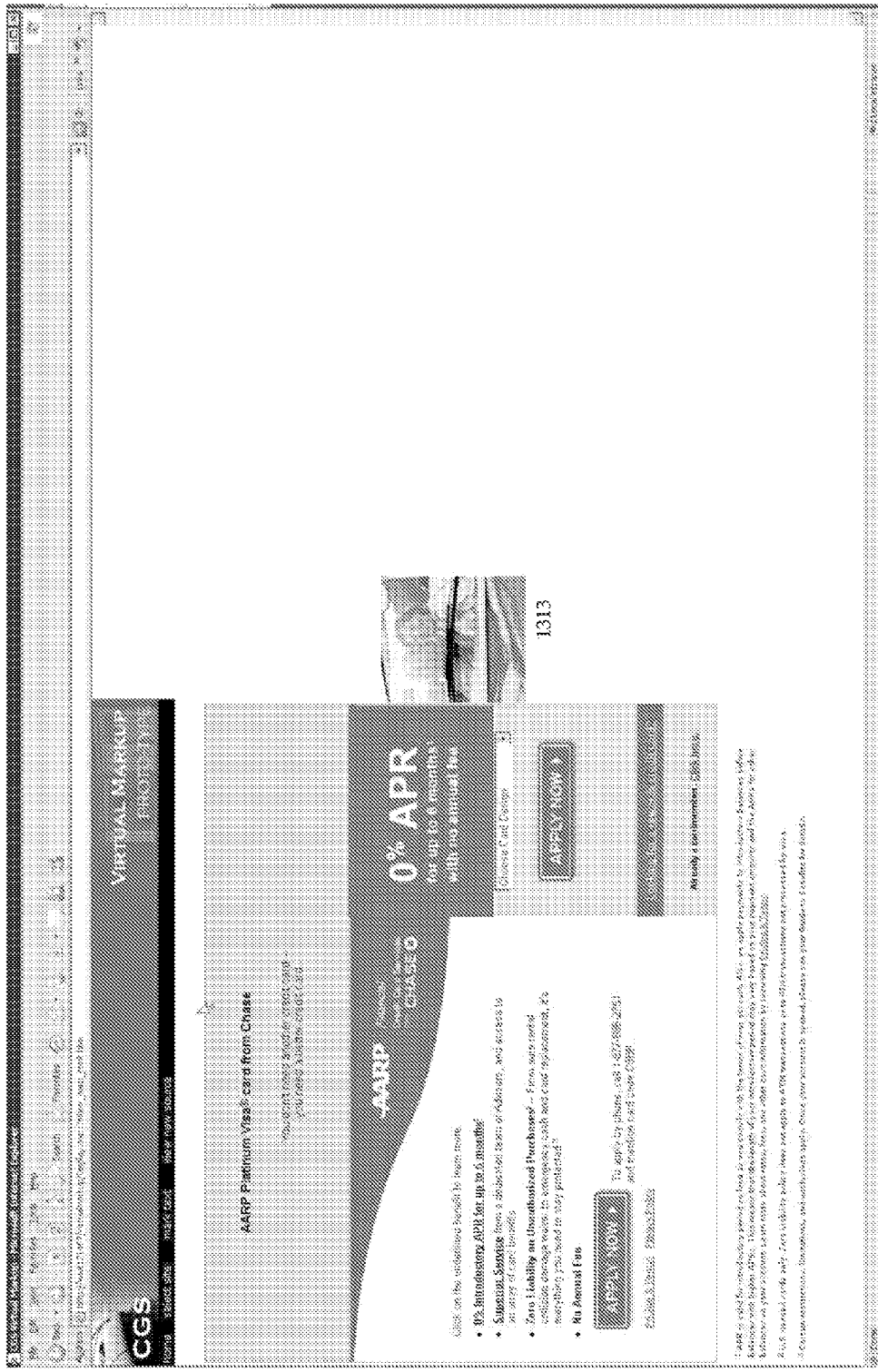
Figure 13H:
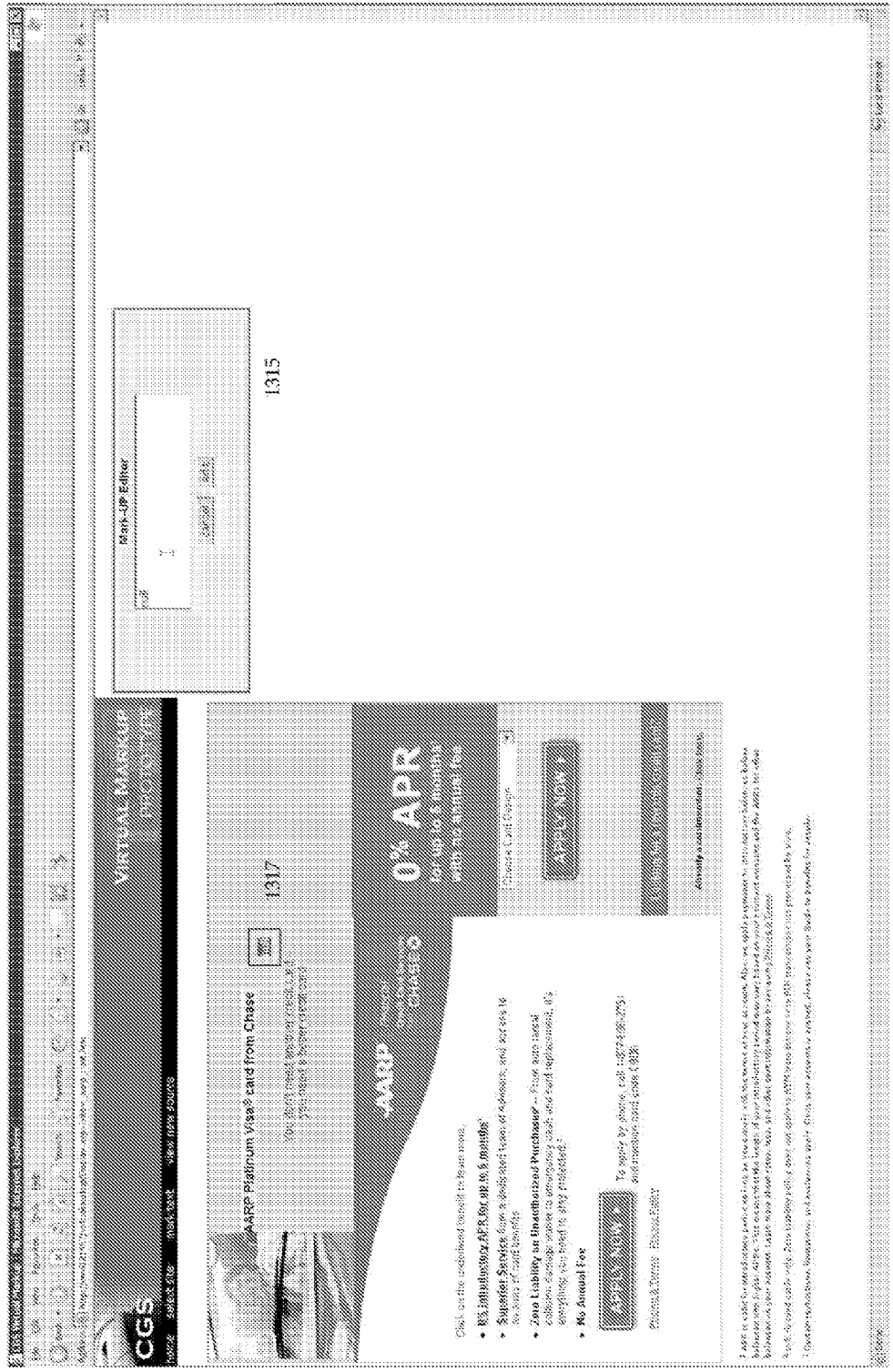
Figure 13I:
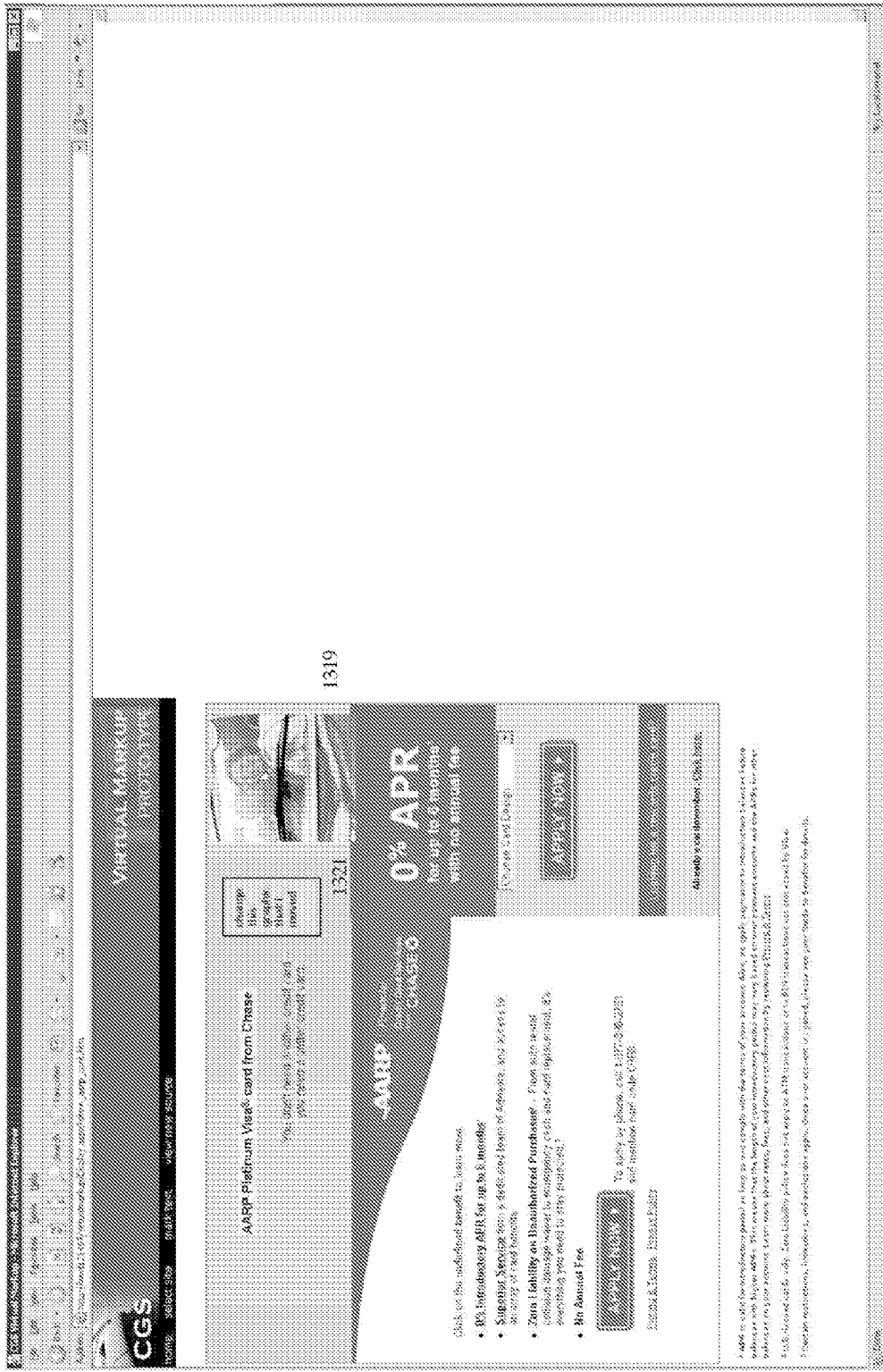
Figure 13J:
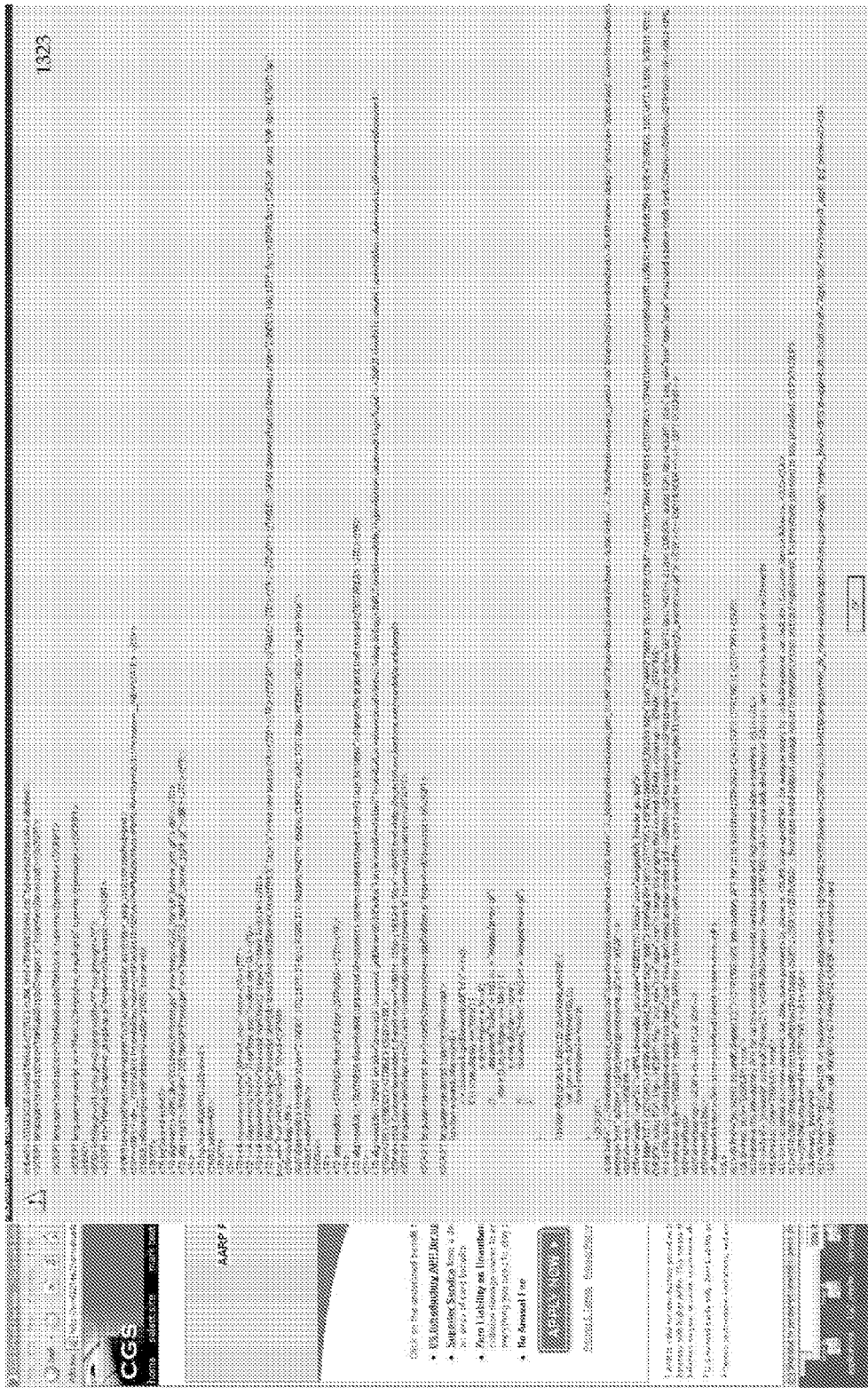

FIGS. 13A-13J illustrate yet another exemplary embodiment of the markup tool. FIG. 13A illustrates a sample dialogue box 1301 populated with choices of websites to markup. In one embodiment, the dialogue box is controlled/governed by user profile and/or roles. FIG. 13B illustrates how a captured site 1303 may be displayed in the markup tool. FIG. 13C illustrates a sample dialogue box 1305 to enter in comments that a user would want to associate to a location on the web page. FIG. 13D illustrates a disclaimer 1307 that may be needed in connection with the ability to modify digital images. FIG. 13E illustrates a display of the underlying HTML 1309 that a user may see changed from the original source. In this embodiment, an implemented tagging structure allows for a systemic analysis of the HTML to identify what was marked up. FIG. 13F illustrates a website in which a user moves an image 1311. FIG. 13G illustrates the same website with the image 1313 moved out to the right. FIG. 13H illustrates the same website and a "Markup Editor" box 1315 allowing a user to change text 1317 on the site. FIG. 13I illustrates shows a moved graphic 1319 with an associated "sticky note" 1321. FIG. 13J illustrates the underlying HTML 1323 that was changed when a user moved the graphic.

Figure 15:
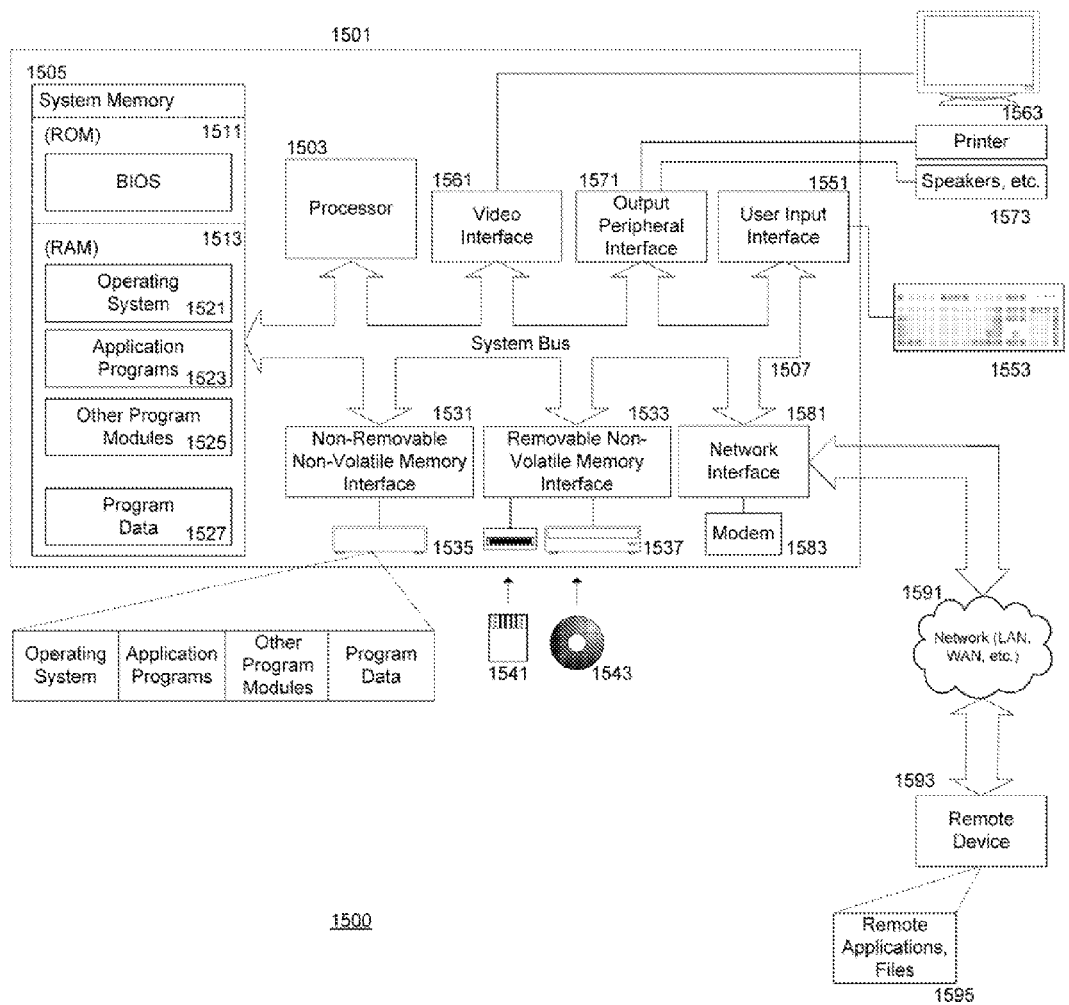
FIG. 15 is a schematic diagram of an exemplary computing system environment for use in implementing one or more of the disclosed embodiments.

FIG. 15 is a schematic diagram of an exemplary computing system environment 1500 for use in implementing one or more of the disclosed embodiments. As understood by those of ordinary skill in the art, the various embodiments disclosed herein may be implemented by or include a computer or computers. Disclosed embodiments may be described in the general context of computer-executable instructions, such as program modules, being executed by a computer. Generally, program modules include routines, programs, objects, components, data structures, etc. that performs particular tasks or implement particular abstract data types.

Those skilled in the art will appreciate that the disclosed embodiments may be practiced with various computer system configurations, including hand-held wireless devices such as mobile phones or PDAs, multiprocessor systems, microprocessor-based or programmable consumer electronics, minicomputers, mainframe computers, and the like. The embodiment may also be practiced in distributed computing environments where tasks are performed by remote processing devices that are linked through a communications network. In a distributed computing environment, program modules may be located in both local and remote computer storage media including memory storage devices.

The computer system may include a general purpose computing device in the form of a computer 1501 including a processing unit 1503, a system memory 1505, and a system bus 1507 that couples various system components including the system memory to the processing unit.

Computers typically include a variety of computer readable media that can form part of the system memory and be read by the processing unit. By way of example, and not limitation, computer readable media may include computer storage media and communication media. The system memory 1505 may include computer storage media in the form of volatile and/or nonvolatile memory such as read only memory (ROM) 1511 and random access memory (RAM) 1513. A basic input/output system (BIOS), containing the basic routines that help to transfer information between elements, such as during start-up, is typically stored in ROM. RAM typically contains data and/or program modules that are immediately accessible to and/or presently being operated on by processing unit. The data or program modules may include an operating system 1521, application programs 1523, other program modules 1525, and program data 1527. The operating system may be or include a variety of operating systems such as Microsoft Windows® operating system, the Unix operating system, the Linux operating system, the Xenix operating system, the IBM AIX™ operating system, the Hewlett Packard UX™ operating system, the Novell Netware™ operating system, the Sun Microsystems Solaris™ operating system, the OS/2™ operating system, the BeOS™ operating system, the Macintosh™® operating system, the Apache™ operating system, an OpenStep™ operating system or another operating system of platform.

The memory includes at least one set of instructions that is either permanently or temporarily stored. The processor 1503 executes the instructions that are stored in order to process data. The set of instructions may include various instructions that perform a particular task or tasks, such as those shown in the appended flowcharts. Such a set of instructions for performing a particular task may be characterized as a program, software program, software, engine, module, component, mechanism, or tool. The embodiments may include a plurality of software processing modules stored in a memory as described above and executed on a processor in the manner described herein. The program modules may be in the form of any suitable programming language, which is converted to machine language or object code to allow the processor or processors to read the instructions. That is, written lines of programming code or source code, in a particular programming language, may be converted to machine language using a compiler, assembler, or interpreter. The machine language may be binary coded machine instructions specific to a particular computer.

Any suitable programming language may be used in accordance with the various embodiments of the embodiment. Illustratively, the programming language used may include assembly language, Ada, APL, Basic, C, C++, C#, COBOL, dBase, Forth, FORTRAN, Java, Modula-2, Pascal, Prolog, REXX, Java and/or JavaScript, for example. In one embodiment, the markup tool is implemented in Java, C, C# or a stand-alone compiled application as is known in the art of software design. In yet another embodiment, the model is provided as a web-based application. Further, it is not necessary that a single type of instruction or programming language be utilized in conjunction with the operation of the system and method of the embodiment. Rather, any number of different programming languages may be utilized as is necessary or desirable.

Also, the instructions and/or data used in the practice of the embodiment may utilize any compression or encryption technique or algorithm, as may be desired. An encryption module might be used to encrypt data. Further, files or other data may be decrypted using a suitable decryption module.

The computing environment may also include other removable/nonremovable, volatile/nonvolatile computer storage media. For example, a hard disk drive 1535 may read or write to nonremovable, nonvolatile magnetic media. A magnetic disk drive may read from or writes to a removable, nonvolatile magnetic disk, a flash memory reader may read from a flash storage medium 1541, and an optical disk drive 1537 may read from or write to a removable, nonvolatile optical disk 1543 such as a CD-ROM or other optical media. Other removable/nonremovable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The storage media are typically connected to the system bus through a removable or non-removable memory interface 1531, 1533.

The processing unit that executes commands and instructions may be a general purpose computer, but may utilize any of a wide variety of other technologies including a special purpose computer, a microcomputer, mini-computer, mainframe computer, programmed micro-processor, micro-controller, peripheral integrated circuit element, a CSIC (Customer Specific Integrated Circuit), ASIC (Application Specific Integrated Circuit), a logic circuit, a digital signal processor, a programmable logic device such as an FPGA (Field Programmable Gate Array), PLD (Programmable Logic Device), PLA (Programmable Logic Array), RFID processor, smart chip, or any other device or arrangement of devices that is capable of implementing the steps of the processes of the embodiment.

It should be appreciated that the processors and/or memories of the computer system need not be physically in the same location. Each of the processors and each of the memories used by the computer system may be in geographically distinct locations and be connected so as to communicate with each other in any suitable manner. Additionally, it is appreciated that each of the processor and/or memory may be composed of different physical pieces of equipment.

A user may enter commands and information into the computer through a user interface that includes input devices 1553 such as a keyboard and pointing device, commonly referred to as a mouse, trackball or touch pad. Other input devices may include a microphone, joystick, game pad, satellite dish, scanner, voice recognition device, keyboard, touch screen, toggle switch, pushbutton, or the like. These and other input devices are often connected to the processing unit through a user input interface 1551 that is coupled to the system bus, but may be connected by other interface and bus structures, such as a parallel port, game port or a universal serial bus (USB).

One or more monitors or display devices 1563 may also be connected to the system bus via an interface 1561. In addition to display devices, computers may also include other peripheral output devices 1573, which may be connected through an output peripheral interface 1571. The computers implementing a disclosed embodiment may operate in a networked environment 1591 using logical connections to one or more remote computers, servers, databases or other remote devices 1593, the remote devices typically including some 1595 or all of the elements described above.

Various networks may be implemented in accordance with various embodiments, including a wired or wireless local area network (LAN) and a wide area network (WAN), wireless personal area network (PAN) and other types of networks. When used in a LAN networking environment, computers may be connected to the LAN through a network interface or adapter 1581. When used in a WAN networking environment, computers typically include a modem 1583 or other communication mechanism. Modems may be internal or external, wired or wireless, and may be connected to the system bus via the user-input interface, or other appropriate mechanism. Computers may be connected over the Internet, an Intranet, Extranet, Ethernet, or any other system that provides communications. Some suitable communications protocols may include TCP/IP, UDP, or OSI for example. For wireless communications, communications protocols may include Bluetooth, Zigbee, IrDa or other suitable protocol. Furthermore, the various components of the system may communicate through a combination of wired or wireless paths.

Although many other internal components of the computer are not shown, those of ordinary skill in the art will appreciate that such components and the interconnections are well known. Accordingly, additional details concerning the internal construction of the computer need not be disclosed in connection with the embodiments described herein.

Various disclosed embodiments advantageously allow users to add and review markup indications to a functional Internet or intranet web page without the need for programming knowledge or specially installed tools on the user's machine. The markup tool reduces the need for printing out multiple versions of a website or webpage in a collaborative review and production process.

While multiple embodiments have been shown and described, various modifications may be made by one of ordinary skill in the art without departing from the scope of the present disclosure, the following claims and their equivalents.

The invention claimed is:

1. A computer-implemented method for collaborative markup of a webpage involving collaboration between multiple users, the method comprising:
    providing a capture interface available to user computers over a network, the capture interface including a menu of original webpages available for modification, the webpages residing at a webpage server;
    receiving at a markup server a capture request from a first user for an original webpage selected from the available original webpages residing at a webpage server and offered through the capture interface;
    capturing the original webpage from the webpage server including an original layout and original content, the original content including interactive features and the original layout being described by original layout information included in the original webpage;
    receiving a designation that indicates one or more portions of the original webpage as protected from modification;
    providing a mark-up interface to the first user, the mark-up interface including a toolbar allowing positioning of toolbar icons onto portions of the original webpage designated by the first user for modification;
    receiving first markup data associated with the first user, the first markup data corresponding to a modification of at least the original layout of the original webpage, the first markup data including a first time stamp, a first user stamp and a first modifier;
    storing the received first markup data in a related file in a computer memory accessible to the markup sever separately from the original webpage;
    automatically generating at the markup server using computer processing components a first code for a first marked-up webpage based on the received first markup data, thereby rendering a first marked-up webpage based on the first markup data and enabling the first user to view the first marked-up webpage including the first markup data in real time, wherein generating the first code comprises creating a first delta file representing a difference between the original webpage and the first marked-up web page;
    generating an audit trail reflecting the first mark-up data based on the first markup data and the first delta file;
    notifying a second user that the first marked-up web page was generated and automatically transmitting from the markup server the first code to a second user for real-time rendering of the first marked-up webpage to the second user, thereby enabling the second user to view the modified webpage including the first markup data in real time;
    providing the mark-up interface to the second user, the mark-up interface including the toolbar allowing positioning of toolbar icons onto portions of the modified webpage designated by the second user for modification;
    receiving, at the markup server, second markup data associated with the second user, the second markup data corresponding to a modification of at least one of the original layout or the first markup data, the second markup data including a second time stamp, a second user stamp and a second modifier, wherein the second modifier indicates at least one of an acceptance and a rejection of at least a portion of the first modifier;
    storing the received second mark-up data in a related file in a computer memory accessible to the markup server separately from the original webpage;
    automatically generating at the markup server, using the computer processing components, a second code for a second marked-up webpage based on the second markup data associated with the second user, thereby rendering a second marked-up webpage and enabling the second user to view the second marked-up webpage including the second markup data in real time, wherein generating the second code comprises creating a second delta file corresponding the second markup data reflecting a difference between the first marked-up webpage and the second marked-up webpage;
    updating the generated audit trail based on the second markup and the second delta file; and
    publishing in real-time to the webpage server an updated webpage based on the first markup data or the second markup data, wherein at least a portion of the original webpage remains functional during collaboration.

2. The method of claim 1, further comprising:
    optimizing the code of the second marked-up webpage for Internet distribution; and
    publishing the second marked-up webpage.

3. The method of claim 1, wherein the first modifier includes one of an insertion, deletion, format change, color change, resizing, and annotation.

4. The method of claim 3, wherein the first modifier includes a plurality of options corresponding to content or layout.

5. The method of claim 3, wherein the second modifier includes one of an insertion, deletion, format change, color change, resizing, and annotation.

6. The method of claim 1, further comprising:
    generating, using the computer processing components, a third code for rendering a third marked-up webpage including a comparison view of the first and second marked-up webpage.

7. The method of claim 6, wherein the comparison view simultaneously shows at least a portion of the first marked-up webpage and at least a portion of the second marked-up webpage.

8. The method of claim 1, further comprising:
    assigning an authorization level to at least a portion of the original layout or the original content; and restricting the first markup data or the second markup data based on the authorization level.

9. The method of claim 1, wherein retrieving an original webpage includes detecting at least one of a virus or dangerous script in the original webpage.

10. The method of claim 1, further comprising rendering in real-time a second marked-up webpage to the first user in response to the second user interaction, said rendering based on the second webpage code.

11. The method of claim 1, further comprising creating a virtual comparison flipbook including the original webpage and the first and second marked-up pages.

12. The method of claim 1, further comprising:
recognizing an authorization level assigned to at least a portion of the original layout information or the original content; and
restricting the second markup data based on the authorization level.

13. A system for collaborative markup of digital media, the system comprising:
a markup server configured to
provide a capture interface available to user computers over a network, the capture interface including a menu of original webpages available for modification, the webpages residing at a webpage server,
receiving a capture request from a first user for an original webpage selected from the available original webpages residing at a webpage server and offered through the capture interface, wherein said original webpage is a published webpage,
receive a designation request that indicates one or more portions of the original webpage as protected from modification,
capture the original webpage from the webpage server including original layout information and original content, the original content including interactive features and the original webpage being rendered at a processing platform of a first user in response to the execution of an original code of the webpage,
provide a mark-up interface to the first user, the mark-up interface including a toolbar allowing positioning of toolbar icons onto portions of the original webpage designated by the first user for modification,
receive first markup data associated with the first user in response to a first interaction with the rendered original webpage, the first markup data corresponding to a modification of at least the original layout information, the first markup data including a first time stamp, a first user stamp and a first modifier,
store the received first markup data in a related file in a computer memory accessible to the markup sever separately from the original webpage,
automatically generate, using computer processing components, a first code for a first marked-up webpage based on the received first markup data, thereby rendering a first marked-up webpage based on the first markup data and enabling the first user to view the first marked-up webpage including the first markup data in real time, wherein generating the first code comprises creating a first delta file representing a difference between the original webpage and the first marked-up web page,
generate an audit trail reflecting the first mark-up data based on the first markup data and the first delta file,
notify a second user that the first marked-up web page was generated and automatically transmit the first code to a second user for real-time rendering of the first marked-up webpage to the second user,
provide the mark-up interface to the second user, the mark-up interface including the toolbar allowing positioning of toolbar icons onto portions of the modified webpage designated by the second user for modification,
receive second markup data associated with the second user, the second markup data corresponding to a modification of at least one of the original layout or the first markup data, the second markup data including a second time stamp, a second user stamp and a second modifier, wherein the second modifier indicates at least one of an acceptance and a rejection of at least a portion of the first modifier,
store the received second mark-up data in a related file in a computer memory accessible to the markup server separately from the original webpage,
automatically generate, using the computer processing components, a second code for a second marked-up webpage based on the second markup data from the second user, thereby rendering a second marked-up webpage and enabling the second user to view the second marked up webpage including the second markup data in real time, wherein generating the second code comprises creating a second delta file corresponding the second markup data reflecting a difference between the first marked-up webpage and the second marked-up webpage,
update the generated audit trail based on the second markup and the second delta file, and
publish in real-time to the webpage server an updated webpage based on the first markup data or the second markup data, wherein at least a portion of the original webpage remains functional during collaboration; and
a database configured to store the original layout information, the original content, the first markup data, the first marked-up webpage, the second markup data, and the second marked-up webpage and the first and second delta files;
wherein at least a portion of rendered webpages is functional during collaboration.

14. The system of claim 13, further comprising:
a client connected to the markup server over the Internet, wherein the client is configured, using at least one processor, to
(i) render the first marked-up webpage based on first markup data,
(ii) generate second markup data associated with the second user, and
(iii) render the second marked-up webpage based on the second markup data as the second markup data is generated.

* * * * *